United States Patent
Helfman et al.

(10) Patent No.: US 8,640,056 B2
(45) Date of Patent: Jan. 28, 2014

(54) DATA VISUALIZATION TECHNIQUES

(75) Inventors: Jonathan Helfman, Half Moon Bay, CA (US); Joseph Goldberg, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 907 days.

(21) Appl. No.: 11/773,895

(22) Filed: Jul. 5, 2007

(65) Prior Publication Data

US 2009/0013281 A1 Jan. 8, 2009

(51) Int. Cl.
*G06F 3/00* (2006.01)
(52) U.S. Cl.
USPC .......................................... 715/854; 715/968
(58) Field of Classification Search
USPC ......... 715/764–765, 771–773, 774, 962–963, 715/967–969, 853–855, 734–737, 794, 715/802; 707/705, 715, 741–743, 805, 804, 707/752
See application file for complete search history.

(56) References Cited

U.S. PATENT DOCUMENTS

| | | | |
|---|---|---|---|
| 5,555,354 A * | 9/1996 | Strasnick et al. | 345/427 |
| 6,108,006 A * | 8/2000 | Hoppe | 345/420 |
| 6,285,366 B1 * | 9/2001 | Ng et al. | 715/853 |
| 6,349,315 B1 | 2/2002 | Sonoyama et al. | |
| 6,429,868 B1 | 8/2002 | Dehner et al. | |
| 6,496,832 B2 | 12/2002 | Chi et al. | |
| 6,581,068 B1 | 6/2003 | Bensoussan et al. | |
| 6,583,794 B1 | 6/2003 | Wattenberg | |
| 6,628,312 B1 | 9/2003 | Rao et al. | |
| 6,646,652 B2 * | 11/2003 | Card et al. | 345/645 |
| 6,724,403 B1 | 4/2004 | Santoro et al. | |
| 6,812,941 B1 * | 11/2004 | Brown et al. | 715/854 |
| 6,928,436 B2 | 8/2005 | Baudel | |
| 6,941,513 B2 * | 9/2005 | Meystel et al. | 715/256 |
| 7,027,052 B1 | 4/2006 | Thorn et al. | |
| 7,076,742 B1 | 7/2006 | Thorn et al. | |
| 7,250,944 B2 * | 7/2007 | Anderson et al. | 345/419 |
| 7,287,234 B2 | 10/2007 | Leah et al. | |

(Continued)

FOREIGN PATENT DOCUMENTS

JP 2005-011043 A 1/2005

OTHER PUBLICATIONS

"IE Boxing." Internet Archive: Wayback Machine. Feb. 6, 2006. Web. May 20, 2010. <http://web.archive.org/web/20060206032530/http://webhost.bridgew.edu/etribou/layouts/exp/ieboxes.html>.

(Continued)

*Primary Examiner* — Steven Sax
(74) *Attorney, Agent, or Firm* — Kilpatrick, Townsend & Stockton, LLP

(57) ABSTRACT

Systems and methods in accordance with various embodiments of the present invention provide for representing a plurality of data values of a hierarchical dataset as graphical elements in a configurable data visualization. A first data visualization may be displayed in a data visualization display page, along with a user interface. A selection of a rendered root node and rendered leaf nodes to be displayed in a second data visualization is received from the user interface. Based on the selection of the rendered root node and rendered leaf nodes, a number of depth levels to display is determined. Also, which of the depth levels to display are identified based on the selection of the rendered root node and rendered leaf nodes. The second data visualization is rendered based on the determined number of depth levels and the identified depth levels.

23 Claims, 22 Drawing Sheets

(56) References Cited

U.S. PATENT DOCUMENTS

| | | | | |
|---|---|---|---|---|
| 7,336,279 | B1* | 2/2008 | Takiguchi | 345/473 |
| 7,346,858 | B1 | 3/2008 | Berg et al. | |
| 7,378,969 | B2* | 5/2008 | Chan et al. | 340/572.4 |
| 7,427,987 | B2 | 9/2008 | Uthe | |
| 7,429,987 | B2 | 9/2008 | Leah et al. | |
| 7,447,999 | B1* | 11/2008 | Robertson et al. | 715/835 |
| 7,506,274 | B2 | 3/2009 | Zhang et al. | |
| 7,509,591 | B1 | 3/2009 | Thorn et al. | |
| 7,650,570 | B2* | 1/2010 | Torrens et al. | 715/727 |
| 7,689,570 | B2* | 3/2010 | Fuchs | 707/805 |
| 7,707,517 | B2 | 4/2010 | Bier et al. | |
| 8,139,063 | B2 | 3/2012 | Helfman et al. | |
| 8,281,282 | B2 | 10/2012 | Smith | |
| 8,286,100 | B2 | 10/2012 | Helfman et al. | |
| 2001/0007139 | A1 | 7/2001 | Murray | |
| 2002/0046009 | A1 | 4/2002 | Devaquet et al. | |
| 2002/0143864 | A1* | 10/2002 | Page et al. | 709/203 |
| 2002/0169730 | A1 | 11/2002 | Lazaridis | |
| 2002/0169793 | A1 | 11/2002 | Sweeney | |
| 2003/0030634 | A1 | 2/2003 | Sang'udi et al. | |
| 2003/0052838 | A1* | 3/2003 | Kim et al. | 345/32 |
| 2003/0158846 | A1 | 8/2003 | Ikehata et al. | |
| 2003/0182177 | A1* | 9/2003 | Gallagher et al. | 705/10 |
| 2003/0214538 | A1* | 11/2003 | Farrington et al. | 345/854 |
| 2003/0237057 | A1 | 12/2003 | Riedl et al. | |
| 2004/0046787 | A1 | 3/2004 | Henry et al. | |
| 2004/0076139 | A1 | 4/2004 | Kang-Yeh et al. | |
| 2004/0107277 | A1* | 6/2004 | Levesque et al. | 709/223 |
| 2004/0168115 | A1 | 8/2004 | Bauernschmidt et al. | |
| 2004/0181554 | A1* | 9/2004 | Heckerman et al. | 707/104.1 |
| 2004/0183800 | A1* | 9/2004 | Peterson | 345/440 |
| 2004/0205535 | A1 | 10/2004 | Newman et al. | |
| 2004/0205536 | A1 | 10/2004 | Newman et al. | |
| 2004/0212615 | A1 | 10/2004 | Uthe | |
| 2004/0225962 | A1 | 11/2004 | Ohashi et al. | |
| 2004/0236549 | A1 | 11/2004 | Dalton | |
| 2004/0263513 | A1 | 12/2004 | Smith et al. | |
| 2004/0264513 | A1 | 12/2004 | Shima et al. | |
| 2005/0114786 | A1* | 5/2005 | Decombe | 715/764 |
| 2005/0149269 | A1* | 7/2005 | Thomas et al. | 702/19 |
| 2005/0160004 | A1 | 7/2005 | Moss et al. | |
| 2005/0192930 | A1* | 9/2005 | Hightower et al. | 707/1 |
| 2006/0037019 | A1* | 2/2006 | Austin et al. | 718/100 |
| 2006/0082592 | A1 | 4/2006 | Black-Ziegelbein et al. | |
| 2006/0109949 | A1 | 5/2006 | Tkaczyk et al. | |
| 2006/0235838 | A1* | 10/2006 | Shan et al. | 707/4 |
| 2006/0242169 | A1* | 10/2006 | Tunning | 707/100 |
| 2006/0248468 | A1 | 11/2006 | Constantine et al. | |
| 2007/0011146 | A1 | 1/2007 | Holbrook | |
| 2007/0203902 | A1 | 8/2007 | Bauerle et al. | |
| 2007/0217689 | A1 | 9/2007 | Yang et al. | |
| 2007/0226640 | A1* | 9/2007 | Holbrook et al. | 715/765 |
| 2007/0276228 | A1 | 11/2007 | Vining et al. | |
| 2008/0010304 | A1* | 1/2008 | Vempala et al. | 707/100 |
| 2008/0027980 | A1 | 1/2008 | Owens et al. | |
| 2008/0027981 | A1 | 1/2008 | Wahl | |
| 2008/0046462 | A1 | 2/2008 | Kaufman et al. | |
| 2008/0059911 | A1* | 3/2008 | Kulo et al. | 715/853 |
| 2008/0088628 | A1* | 4/2008 | Lu et al. | 345/440 |
| 2008/0216169 | A1* | 9/2008 | Naizhen et al. | 726/16 |
| 2008/0222129 | A1 | 9/2008 | Komatsu et al. | |
| 2008/0231633 | A1* | 9/2008 | Keller et al. | 345/426 |
| 2008/0278496 | A1 | 11/2008 | Helfman et al. | |
| 2008/0295038 | A1 | 11/2008 | Helfman et al. | |
| 2009/0012991 | A1 | 1/2009 | Johnson et al. | |
| 2009/0013270 | A1 | 1/2009 | Helfman et al. | |
| 2009/0013271 | A1 | 1/2009 | Helfman et al. | |
| 2009/0013287 | A1 | 1/2009 | Helfman et al. | |
| 2009/0172603 | A1* | 7/2009 | Young Suk Lee | 715/854 |
| 2010/0214120 | A1 | 8/2010 | Means et al. | |
| 2010/0280877 | A1 | 11/2010 | Shelton et al. | |
| 2010/0287146 | A1 | 11/2010 | Skelton et al. | |
| 2011/0016432 | A1 | 1/2011 | Helfman | |

OTHER PUBLICATIONS

Shneiderman, B., "Tree Visualization with Tree-Maps: A 2-D Space Filling Approach," ACM Transactions on Graphics, (Jun. 18, 1991), downloaded from the Internet: <<http://hcil.cs.umd.edu/trs/91-03/91-03.html>> 8 pages.

Singh et al., "Enterprise Reporting with Oracle Reports: Reliable, Extensible, and Integrated," an Oracle White Paper, (Aug. 5, 2005), Oracle Fusion Middleware, downloaded from the Internet: <<http://www.oracle.com/technology/products/reports/index.html>>, 16 pages total.

smartmoney.com, <<webpage>>"Map of the Marker", downloaded from the Internet: <<http://www.smartmoney.com/marketmap/popupfresh.cfm>>.

The Hive Group, "Honeycomb: The Application for Turning Enterprise Data into Actionable Information," downloaded from the Internet: <<http://hivegroup.com/products.html>>, 3 pages total.

The Hive Group, "Manufacturing Quality Management," downloaded from the Internet: <<www.hivegroup.com/demos/product_mgmnt/product_failure_readlink.html>>.

Office Action mailed on Sep. 17, 2010, in related U.S. Appl. No. 11/773,880.

Office Action mailed on Sep. 17, 2010, in related U.S. Appl. No. 11/773,908.

Office Action mailed on Nov. 23, 2010, in related U.S. Appl. No. 11/773,916.

Office Action mailed on Nov. 24, 2010, in related U.S. Appl. No. 11/752,915.

Shneiderman, "Treemaps for space-constrained visualization of hierarchies", Dec. 26, 1998, at URL: http://www.cs.umd.edu/hcil/treemap-history/, 12 pages.

Kolatch, et al., "CatTrees: Dynamic Visualization of Categorical Data Using Treemaps", May 2001, at URL: http://www.cs.umd.edu/class/spring2001/cmsc838b/Project/Kolatch_Weinstein/index.html, 12 pages.

Non-Final Office Action for U.S. Appl. No. 11/745,280 mailed on May 24, 2010; 11 pages.

Final Office Action for U.S. Appl. No. 11/745,280 mailed on Nov. 10, 2010; 12 pages.

Non-Final Office Action for U.S. Appl. No. 11/752,915 mailed on Jun. 10, 2010; 10 pages.

Final Office Action for U.S. Appl. No. 11/773,880 mailed on Mar. 10, 2011; 9 pages.

Final Office Action for U.S. Appl. No. 11/773,908 mailed on Mar. 16, 2011; 8 pages.

Non-Final Office Action for U.S. Appl. No. 11/773,916 mailed on Jun. 8, 2010; 8 pages.

Office Action mailed Dec. 22, 2011 in related U.S. Appl. No. 11/773,916.

Andrienko et al., "Interactive maps for visual data exploration," 1999, http://geoanalytics.net/and/papers/ijgis99.pdf, 20 pages.

Wayback machine internet archive date of prior art cited, Feb. 14, 2007.

University of Maryland, Feb. 7, 2004, pp. 1-7.

Manufacturing Quality Management, The Hive Group downloaded from the Internet: <<www.hivegroup.com/demos/product_mgmnt/product_failure_readlink.html>>.

U.S. Appl. No. 11/745,280, Notice of Allowance mailed on Nov. 17, 2011, 13 pages.

U.S. Appl. No. 11/752,915, Non Final Office Action mailed on Jun. 12, 2013, 15 pages.

U.S. Appl. No. 11/752,915, Office Action mailed on Feb. 13, 2012, 18 pages.

U.S. Appl. No. 11/752,915, Office Action mailed on Sep. 6, 2012, 18 pages.

U.S. Appl. No. 11/773,880, Non Final Office Action mailed on Mar. 26, 2013, 10 pages.

U.S. Appl. No. 11/773,895, Final Office Action mailed on Mar. 16, 2011, 10 pages.

U.S. Appl. No. 11/773,908, Notice of Allowance mailed on Feb. 10, 2012, 14 pages.

(56) References Cited

OTHER PUBLICATIONS

U.S. Appl. No. 11/773,908, Notice of Allowance mailed on Jun. 11, 2012, 9 pages.

U.S. Appl. No. 11/773,916, Office Action mailed on Oct. 15, 2012, 10 pages.

U.S. Appl. No. 12/503,404, Final Office Action mailed on Mar. 29, 2013, 21 pages.

U.S. Appl. No. 12/503,404, Final Office Action mailed on Jul. 19, 2013, 21 pages.

U.S. Appl. No. 12/503,404, Office Action mailed on Aug. 31, 2012, 24 pages.

* cited by examiner

| | Order_Number | Item | Shipped_From | Customer | Date_Sold | Dollar_Value | Avg_Stock_Level | Quantity | Items_Category | Days_Late | Planner |
|---|---|---|---|---|---|---|---|---|---|---|---|
| 10010 | ORD-328309 | MRX013 | San Antonio | Sports Authority | 02-OCT-06 | 53945 | 21 | 596 | Soccer | > 20 Days | Claire Shaw |
| 10011 | ORD-272536 | MRX013 | Budapest | Sports Authority | 21-AUG-06 | 58714 | 47 | 495 | Soccer | > 20 Days | Amit Singh |
| 10012 | ORD-640492 | MRX013 | Fort Worth | Sports Authority | 25-SEP-06 | 94772 | 8 | 894 | Soccer | 5 - 20 Days | Claire Shaw |
| 10013 | ORD-412864 | MRX013 | San Antonio | Sports Authority | 18-SEP-06 | 102434 | 3 | 571 | Soccer | < 5 Days | Ben Tomassetti |
| 10014 | ORD-785351 | TRBZ007 | Fort Worth | Sports Authority | 02-OCT-06 | 108886 | 34 | 881 | Soccer | > 20 Days | Ben Tomassetti |
| 10015 | ORD-814718 | TRBZ007 | Fort Worth | Sports Authority | 18-SEP-06 | 138331 | 22 | 881 | Soccer | > 20 Days | Amit Singh |
| 10016 | ORD-868869 | MRX013 | San Antonio | Target | 02-OCT-06 | 348 | 48 | 282 | Soccer | > 20 Days | Amit Singh |
| 10017 | ORD-382518 | TRBZ007 | Fort Worth | Target | 28-AUG-06 | 1205 | 3 | 214 | Soccer | < 5 Days | Amit Singh |
| 10018 | ORD-685952 | TRBZ007 | Fort Worth | Target | 28-AUG-06 | 3861 | 21 | 891 | Soccer | > 20 Days | Amit Singh |
| 10019 | ORD-430811 | TRBZ007 | Budapest | Target | 11-SEP-06 | 24142 | 9 | 361 | Soccer | 5 - 20 Days | Claire Shaw |
| 10020 | ORD-112911 | MRX013 | Budapest | Target | 04-SEP-06 | 51764 | 26 | 341 | Soccer | 5 - 20 Days | Claire Shaw |
| 10021 | ORD-477088 | MRX013 | Budapest | Target | 02-OCT-06 | 56701 | 13 | 596 | Soccer | 5 - 20 Days | Claire Shaw |
| 10022 | ORD-429326 | MRX013 | Fort Worth | Target | 04-SEP-06 | 68150 | 35 | 490 | Soccer | > 20 Days | Ben Tomassetti |
| 10023 | ORD-525772 | MRX013 | Fort Worth | Target | 04-SEP-06 | 78143 | 37 | 408 | Soccer | > 20 Days | Ben Tomassetti |

| ID | LOCATION | ORDER_SIZE | ORDER_FREQUENCY | ROOT | SEVERITY |
|---|---|---|---|---|---|
| 4 | Memphis | 127 | 167 | root | severe |
| 8 | El Paso | 66 | 66 | root | severe |
| 5 | Detroit | 100 | 98 | root | fatal |
| 2 | Beverly Hills | 2470 | 234 | root | unknown |
| 3 | SoHo | 145 | -156 | root | fatal |
| 6 | St. Louis | 68 | -87 | root | severe |
| 1 | Hollywood | 300 | -250 | root | - |
| 7 | Chicago | 78 | 88 | root | severe |

| Column Name | Data Type | Nullable |
|---|---|---|
| ID | NUMBER(4,0) | No |
| SEVERITY | VARCHAR2(6) | Yes |
| RELEASE | VARCHAR2(15) | No |
| PRODUCT_FAMILY | VARCHAR2(40) | No |
| PRODUCT | VARCHAR2(281) | Yes |
| COMPONENT | VARCHAR2(10) | No |
| TOTAL_BUGS | NUMBER | Yes |
| TOTAL_DEVELOPERS | NUMBER | Yes |
| AVERAGE_AGE | NUMBER | Yes |
| CLOSED_BUGS | NUMBER | Yes |
| OPEN_BUGS | NUMBER | Yes |

*FIG. 17*

DATA VISUALIZATION TECHNIQUES

CROSS-REFERENCES TO RELATED APPLICATIONS

This application also is related to the following U.S. Patent Applications, each of which is hereby incorporated herein by reference:

U.S. patent application Ser. No. 11/752,915, filed May 23, 2007, entitled "AUTOMATED TREEMAP GENERATION";

U.S. patent application Ser. No. 11/773,880, filed Jul. 5, 2007, entitled "AGGREGATE LAYOUT FOR DATA VISUALIZATION TECHNIQUES";

U.S. patent application Ser. No. 11/773,916, filed Jul. 5, 2007, entitled "FILTERING FOR DATA VISUALIZATION TECHNIQUES";

U.S. patent application Ser. No. 11/773,908, filed Jul. 5, 2007, entitled "LINKING GRAPHICAL ELEMENTS OF DATA VISUALIZATIONS"; and U.S. patent application Ser. No. 11/745,280, filed May 7, 2007, entitled "RENDERING DATA VISUALIZATION WITH MINIMAL ROUND-OFF ERROR."

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates generally to the visual display of data and, more particularly, to improvements to data visualization techniques.

2. Description of the Related Art

In an increasingly competitive world, enterprises are constantly in need of business intelligence that empowers the decision makers in the organization to act on the information, and thus impart extra competitive edge to the organization's products and services. Businesses succeed or fail based on their ability to accurately quantify how many leads become orders, identify their most profitable customers, forecast manufacturing capabilities, manage reliable supply chains, and create sales projections, for example.

However, obtaining information on which decision makers can act presents several practical challenges. One such challenge is the massive amount of data available to the enterprise in today's Information Age. Conversion of data to information which can be readily understood is a significant obstacle. Additionally, enterprises today have data spread over multiple data sources ranging from legacy systems to relational databases and text files. Even if these problems are surmounted, publishing information in a secure and reliable manner remains another concern for enterprises.

Reporting systems with data visualization functionalities can provide users with the capability to convert diverse data into information that can be easily visualized and deciphered to exploit the information and learn more about the business. Visualization components can emphasize high-level patterns and trends in large and complex datasets. One way of presenting vast amounts of data as comprehendible information is by representing the data in a treemap format. A treemap is a visual representation of a dataset, which is typically hierarchical in nature.

A treemap generally includes a collection of two-dimensional cells of rectangular shape, each of which represents one or more data entries of the dataset. The cells of a treemap have characteristics, such as area, color, and texture, that represent the data. The cell characteristics may also be known as graphical attributes. If the dataset is in the form of a table in a database, the rows of the table may be represented by treemap cells and the columns of the table may represent various data dimensions. A data dimension is a set of related data values such as the values in a column of a database table or correlated fields in an XML file that are marked with a common tag. The data dimensions may be mapped to different cell characteristics of the treemap visualization. Thus, a viewer of the treemap can gain insight into data by examining a grouping of cells and cell characteristics.

One barrier to the wide use of data visualizations is the limitation in available features which make the visualized information more meaningful to users. For example, current treemap solutions do not provide for ways to vary an aggregation function used for generating the data visualization. End users may have certain expectations about how the areas of the lowest-level groups are calculated and these expectations may have an affect on the utility of the treemap. For example, when the data values mapped to the innermost rectangles are average data values, such as average page load time, end users may expect the relative areas of the lowest-level groups to also be averages. Current versions of treemap components do not address this issue, but instead have a fixed method for determining the areas of the lowest-level groups, which are typically implicit in the graph's definition and construction. Typical methods include the fixed methods of either summation (setting the relative areas of the groups to the summation of the values within each group) and count (setting the relative areas of the groups to the total number of values within each group). It would be useful to vary the aggregate function that is used to represent groups at different hierarchical levels of a hierarchical data visualization.

Another barrier to the use of data visualizations is that typical solutions provide default visible depth levels which cannot be modified by users. In order to change the currently viewed hierarchy level, other visualization techniques provide a drilling option, which shows a lower depth level for a selected cell. A sliding window which indicates the number of depth levels that are currently visible may be shown when drilling down. However, the only depth levels that are shown are those that are in the current representation. Thus, users can easily get lost because there is no indication of an overview of how the current view corresponds to the entire hierarchical data set.

Moreover, visualization techniques tend to emphasize a small number of primary or first-order effects, making it difficult to appreciate secondary or second-order effects. For example, a plot of a data set with values that are distributed non-uniformly will invariably emphasize the most unusual data values, the outliers. Almost any plot of the data set {1,2,3,4,5,1000000} will reveal that one value is unusual, but it may make it difficult to appreciate the linear relationship of the similar values. Filters are used to isolate certain ranges of the data values to be displayed in the data visualization. Generally, prior art methods filter based on user-selected ranges. However, a user is unable to easily effectuate filtering using these ranges when the user has quickly isolated the cells on the treemap which illustrate the first order effects. Moreover, filtering based on ranges may have the added disadvantage of simultaneously hiding multiple data values at different depth levels, causing dramatic changes to the appearance of the data visualization. In addition, it may be difficult to model the data values that contribute to the first order effect with a filter that is set up in advance.

Further, solutions are incapable of linking selected portions of the graphical visualization to related information without serious drawbacks. Current data visualization techniques include actions that drill-in to expose details of a selected cell. These drill-in techniques have the disadvantage that they must be pre-programmed into the component's code. Moreover, the drill-in action is typically limited to actions that can only be accomplished by the component itself. Essentially, the drill-in function is narrowed to initiating actions which have been explicitly anticipated by the authors of the visualization component.

BRIEF SUMMARY OF THE INVENTION

In accordance with an embodiment of the invention, systems and methods for improvements to data visualization techniques is provided. A plurality of data values of a hierarchical dataset may be represented as graphical elements in a configurable data visualization. A first data visualization and a user interface is displayed in a data visualization display page, the first data visualization is based on a default configuration of hierarchical depth levels of the dataset. Furthermore, a selection of a rendered root node to be displayed in a second data visualization and a selection of rendered leaf nodes to be displayed in the second data visualization is received through the user interface. Based on the selection of the rendered root node and the selection of the rendered leaf nodes, a number of depth levels to display is determined and which of the depth levels to display is identified. The second data visualization is rendered based on the determined number of depth levels and the identified depth levels.

In one embodiment, the user interface limits the selection of the number of depth levels to be displayed. In another embodiment, the user interface limits the selection of the rendered leaf nodes to be displayed in the second data visualization. Moreover, in yet another embodiment, the user interface limits selection of the rendered root node to be displayed in the second data visualization. The user interface may perform any one or more functions in the form of a double-ended slider bar, where the first end of the slider bar selects the rendered root node and a second end of the slider bar selects the rendered leaf nodes.

A further understanding of the nature and the advantages of the inventions disclosed herein may be realized by reference of the remaining portions of the specification and the attached drawings.

BRIEF DESCRIPTION OF THE DRAWINGS

The invention may best be understood by reference to the following description taken in conjunction with the accompanying drawings in which:

FIG. 3 shows a screenshot of an exemplary data table fragment.

FIG. 12 shows an exemplary data table.

FIG. 17 shows an exemplary table.

DETAILED DESCRIPTION OF THE INVENTION

Figure 1:
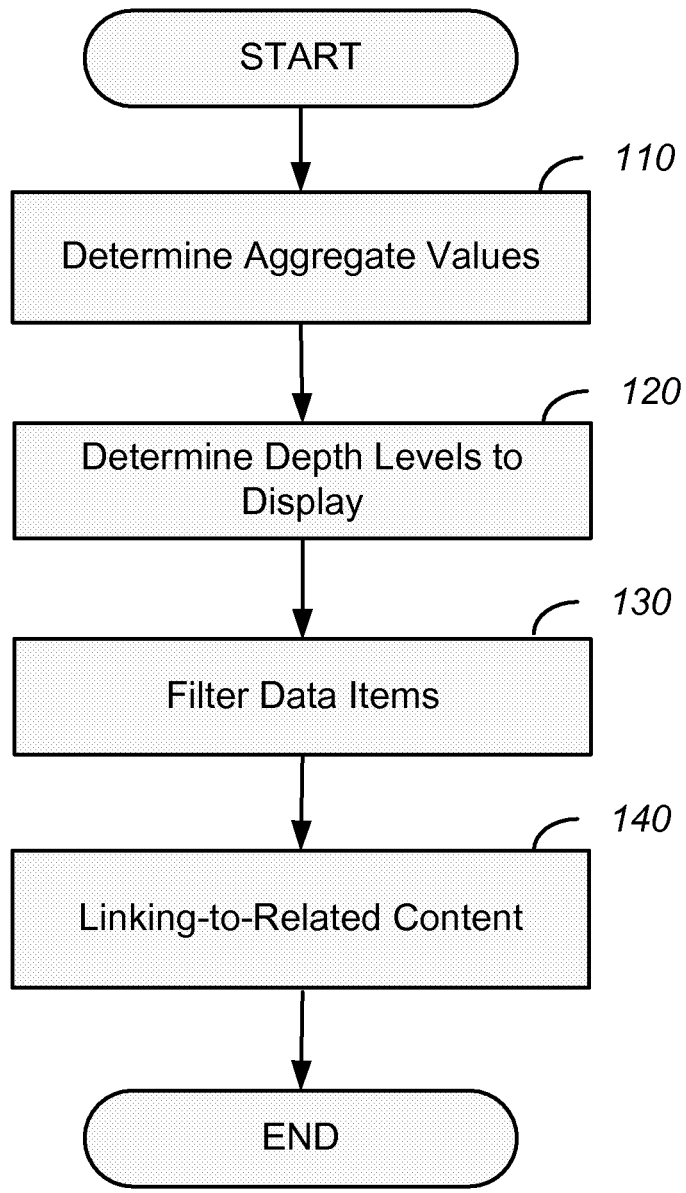
FIG. 1 is an exemplary process flow diagram which illustrates one method of improving data visualization techniques.

Systems and methods described herein provide for improvements to data visualization techniques. The present invention includes systems and methods for improving the usefulness and usability of visualization techniques. Implemented as an application programming interface (API), an automated or semi-automated process, and/or an interactive menu, for example, users may vary the aggregation function used for determining aggregate values of various graphical attributes, such as area or color cell characteristics in a treemap configuration. Moreover, it may be useful to automate or partially automate the selection of an appropriate aggregation function. The aforementioned aggregation solutions could be implemented for other hierarchical visualization techniques.

Current treemap solutions are able to show only a limited number of hierarchical levels at a time. When viewing an inner depth level during a drill-down action, outer depth levels are cut-off from view. Likewise, when panning out to view an outer depth level, inner depth levels and leaf nodes may be removed from view in the treemap component. One solution is to provide a tool to enable the user to dictate the number of depth levels to view, which may be subject to various constraints. Moreover, such a tool may also enable a user to select which of a plurality of depth levels to view in the data visualization. The aforementioned solutions could be implemented for various hierarchical visualization techniques.

Additionally, improved methods for filtering are provided which enable the user to filter elements of the data visualization more intuitively. The user can select particular graphical elements within the treemap component, rather than using ranges of values to filter cells. The aforementioned filtering solutions could be implemented for other hierarchical or non-hierarchical visualization techniques.

Improved methods for linking graphical elements in the data visualization with related information are provided. Web-accessible information may be linked easily to cells of the data visualization using string substitution. The string substitution operates to modify substrings within a URL which is paired to a data table of a dataset. In one embodiment, script instructions replace the substrings with a constant string. More than one substring may need to be modified. Thus, web-accessible processes, programs, and/or services may be linked to a selected cell as related web-accessible information.

In the description that follows, the present invention will be described in reference to embodiments of subsystems on a platform for a software application, such as a database application. However, embodiments are not limited to any particular architecture, environment, application, or implementation. For example, although embodiments will be described in reference to database applications, the invention may be advantageously applied to any software application. Therefore, the description of the embodiments that follows is for purposes of illustration and not limitation.

FIG. 1 is an exemplary process flow diagram which illustrates one method of improving data visualization techniques. At step 110, aggregate values are determined for the data visualization. Typically, only a single aggregate function is used to represent an aggregation of data values and the function is selected based on the type of data visualization. For example, a stacked bar graph typically uses a "summation" aggregate function. The lengths of bar segments represent the magnitude of individual data values, where larger data values correspond to longer lengths of bar segments. When these individual bar segments are stacked together, the total length of the stack of bar segments represents an aggregate value for a group of data values. Essentially, the bar lengths are added together to determine the aggregate value.

In another example, a pie graph typically uses a "percentage" aggregate function where the area of each pie slice corresponds to a ratio of percentages of data values. In yet another example, treemaps may use a "summation" aggregate function to display hierarchical data sets.

Vendors of visualization software tools employ the use of a single aggregation function per type of data visualization and do not permit the user selection of aggregate functions. The ability to select an aggregation function for layout of data visualizations makes the data visualization more informational, customizable, configurable, and extensible. Furthermore, the ability to select and modify an aggregate function allows the end user or designer to make the information conveyed by the data visualization to be more meaningful based on the end user's perceptions and expectations. Further details for determining aggregate values will be discussed below with regard to FIG. 2.

At step 120, depth levels to display are determined. In one embodiment, the depth levels to display are determined by a default configuration. In another embodiment, a user selects the depth levels to display. A user interface, such as a menu, may be provided to enable a user to toggle between the number of depth levels that are shown in the data visualization. Moreover, the particular depth levels to view may be selected. In one embodiment, the depth-level menu is in the form of a slider bar. Other user-selectable menus may also be implemented. Further details will be discussed below with regard to FIG. 10A.

At step 130, cells may be filtered out of a data visualization based on user selection. In one embodiment, a user interface, such as a graphic segment filter menu, may be provided to enable a user to hide a selected graphic cell of a treemap component. A graphic cell may represent one or more data entries of the dataset. The ability to filter certain cells allows the treemap component to convey more meaningful information. For example, outliers may be filtered such that the treemap component may visibly provide more information about the remaining data. Further details about filtering cells will be discussed below with regard to FIG. 11.

At step 140, linking-to-related content may be generated based on user selection of a graphical element in the data visualization. A user interface, such as a menu, may be provided to enable a user to select a link or drill action for the selected graphical element, such as a cell. Content related to the cell is provided to the user. Further details about the linking-to-related content feature will be discussed below with regard to FIG. 16.

Figure 2:
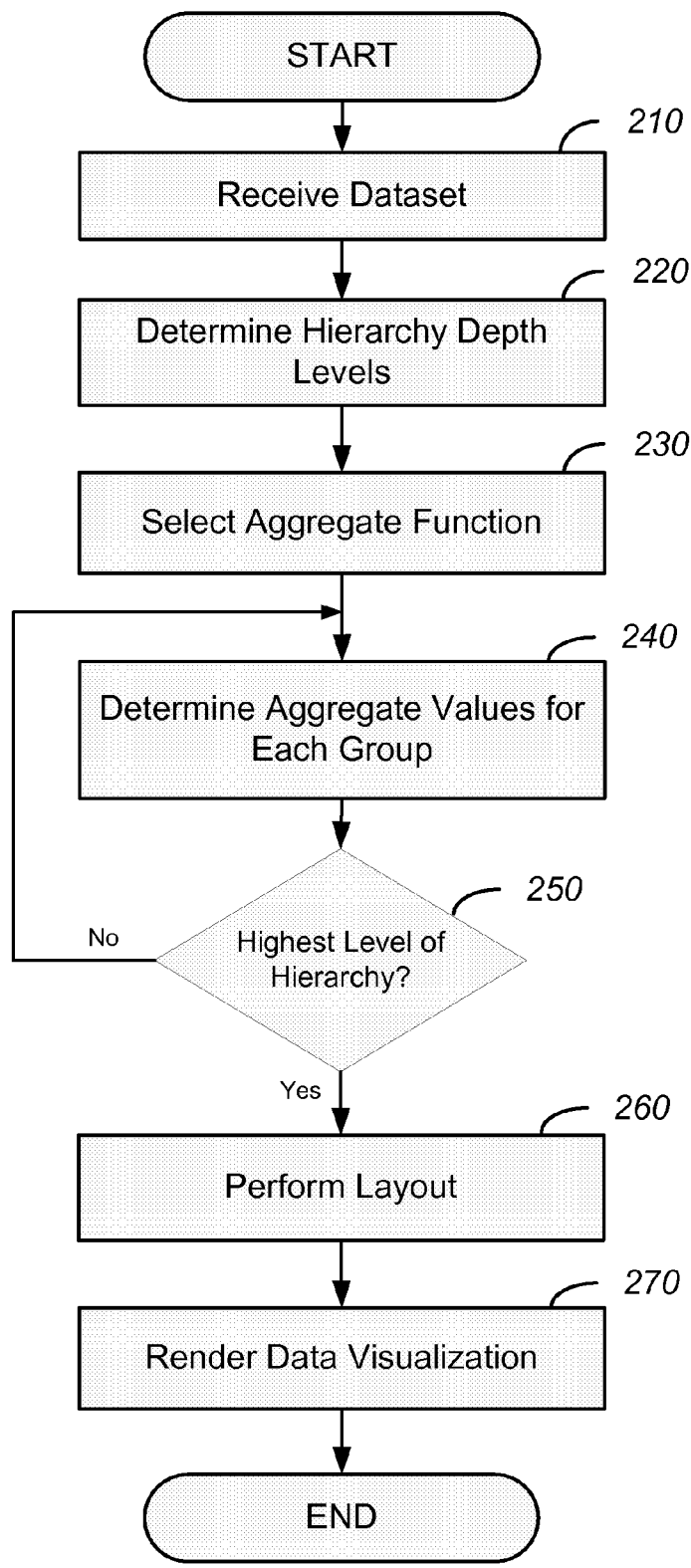
FIG. 2 is an exemplary process flow diagram which illustrates one method of improving data visualization techniques by performing an aggregate layout.

FIG. 2 is an exemplary process flow diagram which illustrates one method of improving data visualization techniques by performing an aggregate layout. As previously discussed, it is useful to enable a user or designer of a data visualization to select and modify an aggregate function used on a hierarchical visualization.

At step 210, a dataset to be visualized is selected and/or received. In one embodiment, the dataset is received from a data storage system, such as a database. The data received is a range of values that will be represented using graphical elements, such as rectangles, within a graphical layout area. FIG. 3 shows a screenshot of an exemplary data table fragment. The data table fragment 300 may relate to retail merchandising. Each row of table 300 stores information related to a purchase order. The rows of table 300 may have data dimensions that include Order_Number, Item, Organization, Customer, Due_Date, Dollar_Value, Avg_Days_Late, Quantity, Item_Category, Days_Late, and Planner. The system may determine the data dimensions which are possible candidates for mapping to area in the data visualization. Each row is interpreted as a data entry which may be displayed as a leaf node in the treemap hierarchy. In most cases, the dataset does not include an aggregate value for a hierarchical group. As such, the aggregate values may be determined as described below.

At step 220, hierarchy depth levels are determined from one or more possible hierarchies. More specifically, a particular hierarchy is determined which specifies one data dimension per level of hierarchy (i.e., one data dimension per group). The hierarchy governs how the data entries in the represented dataset are grouped in the treemap. Data dimensions of a dataset, such as data table attributes, may be correlated to depth levels. Multiple levels of hierarchy may be displayed simultaneously by using nesting rectangles, where depth levels may be nested within each other. The hierarchy depth levels may be determined by selecting a data dimension, for example a data table column of data table fragment 300, to be associated with each depth level. The hierarchy depth level may be automatically selected for a default configuration. In another embodiment, the hierarchy depth level is selected by a user.

Figure 4:
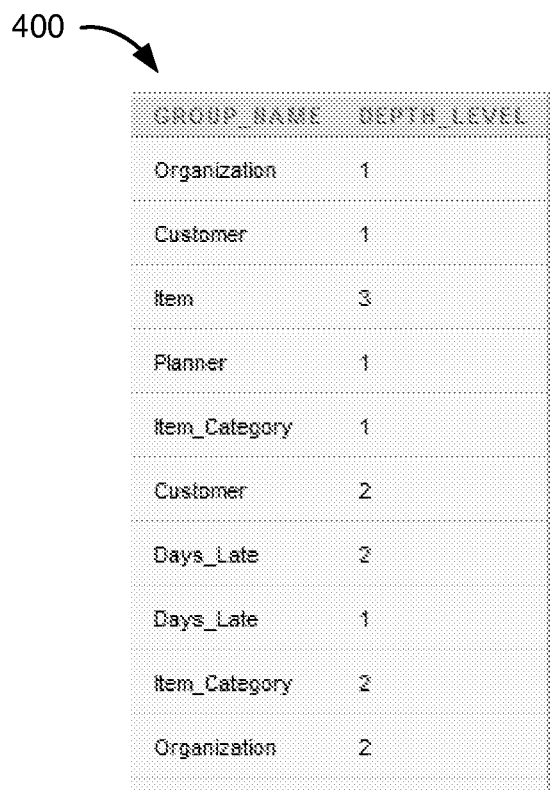
FIG. 4 shows an exemplary hierarchy table.

The selected hierarchy depth levels may be based on one or more possible hierarchies available for the dataset as depicted in a hierarchy table. FIG. 4 shows an exemplary hierarchy table. In one embodiment, the hierarchy table 400 has two columns: Group_Name and Depth_Level. In this example, the group name column is a string data type and the depth level column is an integer data type. Each row in the hierarchy table associates a column from the dataset 300 with a level of hierarchy. The first level of hierarchy includes the column names Organization, Customer, Planner, Item_Category, and Days_Late. The second level of hierarchy includes the column names Customer, Days_Late, Item_Category, and Organization. The third level of hierarchy includes the column name Item. During initialization, the hierarchy table 400 is read by the system and a valid initial hierarchy is selected by the system. The system may also produce various menus in order to enable the user to change the initial hierarchy depicted in the visualization. Other methods of selecting hierarchy depth levels may be used.

Figure 5:
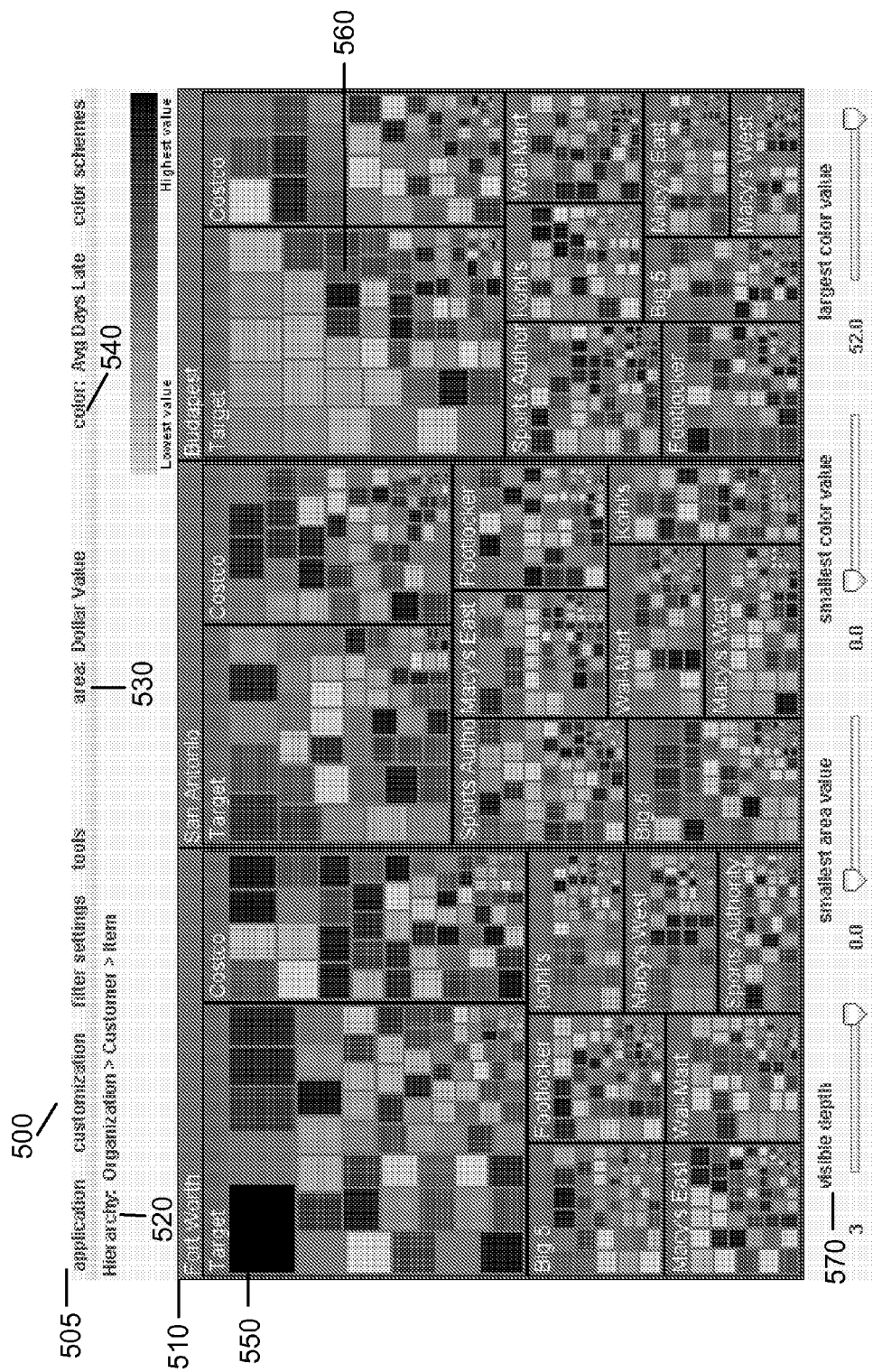
FIG. 5 shows a screenshot of an exemplary treemap component and user interface.

A selected hierarchy depth level may be indicated on a treemap display page. FIG. 5 shows a screenshot of an exemplary treemap component and user interface. In one embodiment, the treemap display page 500 is a published output of the an entire sourced data table, wherein the fragment of the entire sourced data table is represented by FIG. 3. A user interface 505 includes a hierarchy tab 520, an area tab 530, and a color tab 540. In this example, the hierarchy tab 520 indicates the depth levels to include the following data dimensions in decreasing order of hierarchy: Organization, Customer, and Item.

Referring back to FIG. 2, at step 230, an aggregate function is determined. In one embodiment, an aggregate function is determined from a plurality of aggregate functions. The plurality of aggregate functions may include, for example, average (such as mean or median), count, maximum, minimum, and summation. In one embodiment, the aggregate functions are determined for the depth levels. Moreover, aggregate functions may be determined for the distinct graphical attributes of the data visualization. In one embodiment, aggregate functions may be selected for any combination of depth level and/or graphical attribute.

In one embodiment, a user or designer may have an option to select an aggregate function to be applied to one or more depth levels and/or one or more graphical attributes, such as in the form of an interactive menu of a user interface. The user interface is generated to enable a user or designer of the data visualization to initialize before generation of the data visualization or to modify an aggregate function used on the hierarchical visualization. The selection made by the user or designer is then received from the user interface.

In another embodiment, the aggregation function is automatically selected, such as for a default configuration and may be based on selection intelligence. In one embodiment, the selection intelligence is based on the inherent properties of the data visualization. The summation function is appropriate for a 2-dimensional space filling data visualization technique. For example, a treemap data visualization maps a data dimension to cell area. The default configuration may select the summation aggregation function. As previously described, the values for groups are determined by adding the values of the children nodes. For 2-D space filling visualizations, the summation function allows the end user to make more accurate comparisons of cells across various groupings.

In another embodiment, the selection intelligence is based on the metric used to measure the values of the nodes (i.e., the type of data) and selecting the aggregate function which is the same as the metric used to measure the values of the nodes. For example, if the data dimension that is mapped to a graphical attribute, such as area, is an average value, the end user expects the aggregate group representation to be an average as well. Thus, when data that is mapped to graphical attributes is an average, the default configuration selects an "average" aggregate function. An "average" aggregation function may include mean, median, and other known average functions. In another embodiment, if the data dimension is a total or aggregate value (i.e., summation of other values), the summation function is selected as the default.

In another embodiment, the selection intelligence is dependent upon the type of graphical attribute. For the color graphical attribute, the default configuration selects an "average" aggregation function. A data value may be associated with the color graphical attribute. In large groupings, the aggregation of these data values using the summation function for the color graphical attribute become similar shades of a single color. The relevant information for the end user becomes obscured. Using a mean or median aggregation function enables the end user to garner meaningful information from the visualization.

The aforementioned intelligence models the central tendencies and/or expectations of end users. Other selection intelligence may be used based on the task to be performed by the user. For example, if the user's task is to find the groups with the largest average value, the Average aggregation function might be used. In another embodiment, if the user's task is to find the groups with the largest total value, the Summation aggregation function might be used. Additional selection intelligence may be used based on the metric of the data dimension, type of graphical attribute, and the inherent properties of the data visualization itself. In one embodiment, the selection intelligence may be ranked such that one selection of an aggregate function takes priority over another. In another embodiment, aggregate functions may be selected by a combination of receiving the selection from the user interface and selection intelligence.

Another example of intelligence may be based on user role. For novice users, the Summation aggregation function may be used to allow accurate comparisons of areas across groups, while other aggregation functions may be reserved for more experienced users. Combinations of different types of intelligence may be implemented. For example, user role and metric of data dimension can be combined such that for novice users the Summation aggregation function is used unless the data dimension mapped to cell area is an average value, in which case, the Average aggregation function is used.

At step 240, the aggregate values for each group are determined. The selected aggregate function is used to determine the aggregate values for each of the hierarchical groupings. In one embodiment, the aggregate values are determined recursively from the leaf nodes to the highest level of hierarchy. The aggregate values for subsequent levels of hierarchy are determined in successive increasing order. In one embodiment, a data table for each hierarchical depth level is generated, where each data table includes the aggregate values for a hierarchical depth level.

For purposes of this example, the hierarchy depth levels have been determined to include the following data dimensions in decreasing order of hierarchy: Organization, Customer, and Item, as indicated by hierarchy tab 520 of FIG. 5. Hierarchy groups the data entries of data table 300 based on the values of the data entries in the organization column, for a top-level hierarchy, in the customer column, for a second-level hierarchy, and in the item column, for a third-level hierarchy. More specifically, the values in each of hierarchical columns (e.g. organization, customer, and item) in the data table 300 are examined. Rows with identical values of organization, customer, and item are considered to belong to a same category or group. The category may take a name that is equal to the value. Other grouping methods may also be implemented, for example, grouping methods which match as determined by an application-specific matching function. For example a function that considers two values to match if their prefixes of a certain length match, if they are dates occurring in the same year and month, or if they are numerical values with differences that lie within a specified range.

Starting at the leaf nodes of the hierarchy Organization>Customer>Item, the data values in data table fragment 300 are grouped by the lowest level of hierarchy, in this case, by Item. The value of each data entry associated with the data dimension mapped to a graphical attribute within the group are aggregated using the selected aggregate function. For example, the data dimension that is mapped to the area graphical attribute is Dollar Value. The values of each data entry under the Dollar Value column within each of the Item groups are aggregated. In another embodiment, the Avg-DaysLate column is mapped to the color graphical attribute. Accordingly, the values of each data entry associated with the AvgDaysLate column within each of the Item groups are aggregated. For example, the values of 21 and 3 for the group San Antonio>Sports Authority>Item=MRX013 are aggregated. The item MRX013 may be a soccer ball, for example. The value of 47 comprises the group of Budapest>Sports Authority>Item=MRX013. The value of 8 comprises the group of Fort Worth>Sports Authority>Item=MRX013. The value of 48 comprises the group of San Antonio>Target>Item=MRX013. The values of 26, and 13 are aggregated for the group of Budapest>Target>Item=MRX013. Using summation, for example, the value for this group is 39. The values of 35, and 37 are aggregated for the group of Fort Worth>Target>Item=MRX013. Using summation, the value for this group is 72.

For the TRBZ007 Item groupings, the item TRBZ007 may be soccer cleats, for example. The values of 34 and 22 comprise the group of Fort Worth>Sports Authority>Item=TRBZ007. Using summation, for example, the value for this group is 56. The value of 9 comprises the Budapest>Target>Item=TRBZ007 group. The values of 3 and 21 are aggregated for the Fort Worth>Target>Item=TRBZ007 group. Using summation, the value for this group is 24. Thus, the aggregate values for each group for the Organization>Customer>Item hierarchy level have been determined.

Referring back to FIG. 2, processing continues to step 250 where it is determined if the aggregate values for the highest level of hierarchy have been determined. The determination is made by comparing the current level of hierarchy to the hierarchy depth levels determined in step 220. If the values for the highest level of hierarchy have been determined, then processing continues to step 260. Otherwise, the current hierarchy is incremented to the next higher level of hierarchy, and processing loops back to step 240. In one embodiment, if the graphical attribute for which aggregate values have been determined is the color cell characteristic, processing ends after step 250 because color values are not required when performing layout in step 260.

For example, the current hierarchy is incremented to the Organization>Customer hierarchy level. The aggregate values for the area and/or color data dimensions are determined for each group within the Organization>Customer depth level using the values computed within the previous iteration of the recursive loop. For the color data dimension, the previously computed values of 8 (Item=MRX013) and 56 (Item=TRBZ007) are aggregated for the Fort Worth>Sports Authority group. The value for this group using summation is 64. The values of 72 (Item=MRX013) and 24 (Item=TRBZ007) are aggregated for the Fort Worth>Target group. The value for this group using summation is 96. The value of 47 (Item=MRX013) comprises the Budapest>Sports Authority group. The values of 39 (Item=MRX013) and 9 (Item=TRBZ007) are aggregated for the Budapest>Target group. The value for this group using summation is 48. Likewise, the aggregate values for all groups within the level of hierarchy are determined.

Since the Organization>Customer depth level is not the highest level of hierarchy, processing once again loops back to step 250. At the Organization depth level, the aggregate values for the area and/or color data dimensions are determined for each group. The groups include San Antonio, Budapest, and Fort Worth. The values of 96 (Target) and 64 (Sports Authority) are aggregated for the Fort Worth group. Using summation, the value for the Fort Worth group is 160. The values of 47 (Sports Authority) and 48 (Target) are aggregated for the Budapest group. Using summation, the value of the Budapest group is 95. The values of 24 (Sports Authority) and 48 (Target) are aggregated for the San Antonio group. Using summation, the value of the San Antonio group is 72.

A same or different aggregate function may also be applied for determining aggregate values of various graphical attributes. The aggregation is performed in a similar manner as described above. Also, a same or different aggregate function may be applied for determining aggregate values for each depth level. Thus, for a current level of hierarchy and for each group within the current level of hierarchy, the data values within the data dimension being mapped to the color graphical attribute is aggregated.

Referring back to FIG. 2, once it is determined that the aggregate values for the highest level of hierarchy have been determined, processing continues to step 260 where layout is performed in a graphical layout area. In the context of treemap data visualizations, areas for layout are determined from the top level of hierarchy to the lowest level of hierarchy. During layout of the data visualization, the magnitude of the value of the graphical attribute of each group may be proportional to the magnitude of the result of each group's aggregation function. For example, the treemap component 510 of FIG. 5 shows the area occupied by the groups within each level of hierarchy is proportional to the magnitude of the group's value for area. It should be noted that not all graphical attributes may be proportional to the group value. For example, the treemap 510 shows the Organization groups (i.e., Fort Worth, San Antonio, and Budapest) and the Customer groups (i.e., Target, Sports Authority, Costco, etc.) without the color graphical attribute and are all the same shade of gray.

At step 270 of FIG. 2, the data visualization is rendered onto a graphical display region. In one embodiment, the graphical display region is placed within a graphical display page. The graphical display page may include a graphical user interface (GUI), such as a menu, to enable a user to select or change the aggregate functions used per depth level and/or per graphical attribute. When it is detected that a user has selected or changed the aggregate functions to be used, processing may loop back to step 230, and the new aggregate values are determined. Further, when it is detected that the data dimensions mapped to hierarchy depth levels have changed, such as if a user changed the hierarchy from Organization>Customer>Item to Customer>Organization>Item, processing may loop back to step 220.

In another embodiment, the data visualization technique may be used in a more flexible manner that enables users to choose a graph family, rather than a specific graph type. For example, a user could specify a graph family, such as bar graph, and switch between various aggregation functions. Choosing "summation" would show the data as a stacked bar graph, while choosing "percentage" would show the data as a percent stacked bar graph. The advantage of such a system is that users can focus on extracting information from their data without first having to understand the properties of different graph types and matching the graph type to fit the data.

FIGS. 5-9 will now be discussed to illustrate the features of various aggregate functions. As previously discussed, the summation function may allow the end user to make more accurate comparisons of cells across various groups for 2-D space filling visualizations. The area occupied by the cells is proportional to the magnitude of the value that the cells represent in comparison to the other cells in the group. Moreover, the cells retain proportionality across cells in other groups using summation. For example, referring back to FIG. 5, the aggregate function used for area is summation. Cell 550 represents the dollar values of the soccer ball item for the Fort Worth>Target>Item=MRX013 group. Cell 560 represents the dollar value of a soccer cleats item for the Budapest>Target>Item=TRBZ007 group. Cell 560 appears smaller than cell 550. The difference in size may represent the proportional difference in values between these two cells.

The data values corresponding to these cells reveal that the apparent difference in size is an accurate depiction of the difference in the magnitude of the cell values. Table fragment 300 shows that the dollar value of cell 550 is 146,293, which is the summation of the dollar values of 68150 and 78143. The dollar value of cell 560 is 24142. The area occupied by cell 550 may appear to be proportionally larger than the area occupied by cell 560. In this example, cell 550 appears to be about six times larger than cell 560. Thus, even though the areas for cells 550 and 560 are in separate groups and separate parts of the treemap configuration 510, the comparison between the cells can be made accurately.

Figure 6:
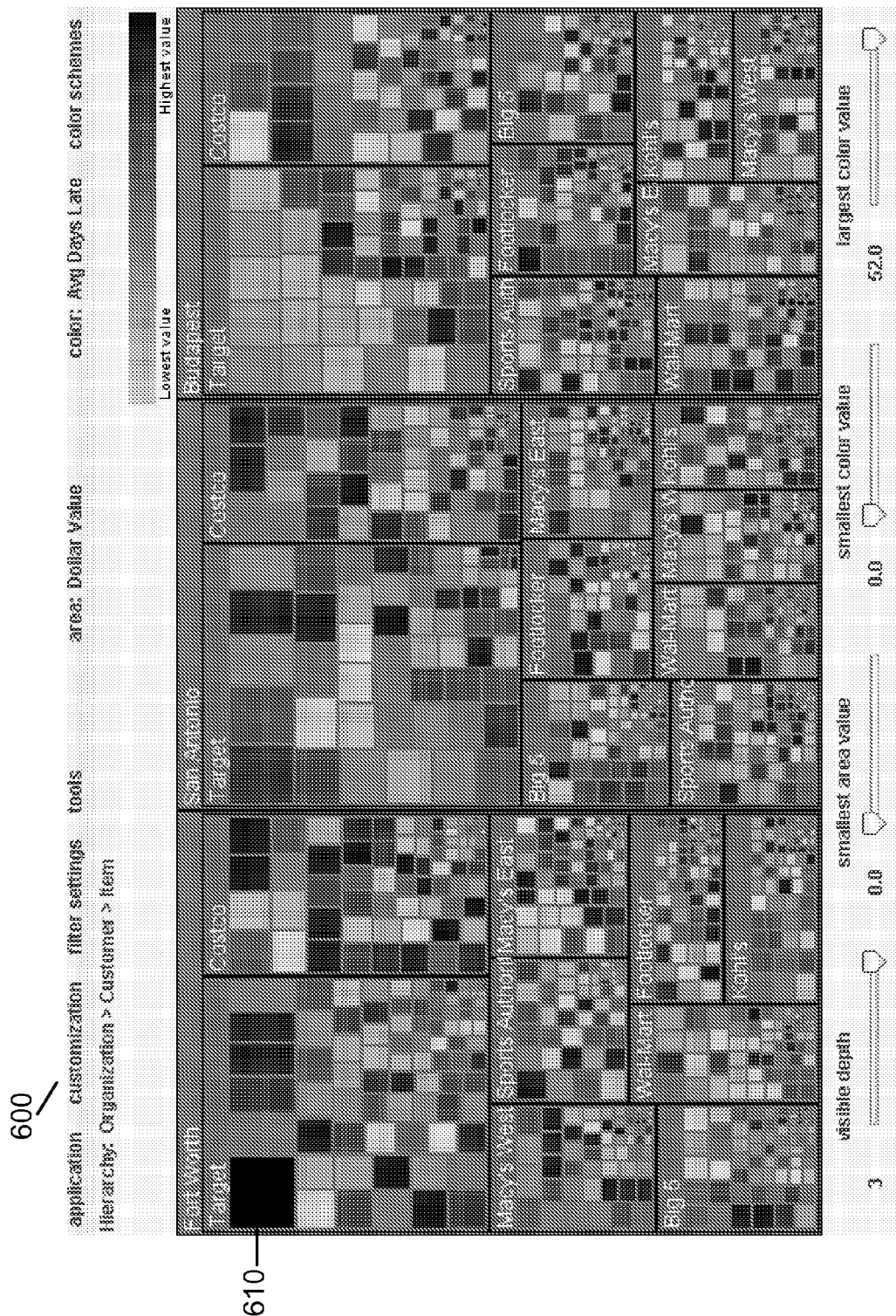
FIG. 6 shows a screenshot of an exemplary treemap component using mean aggregation.

FIG. 6 shows a screenshot of an exemplary treemap component using mean aggregation. In one embodiment, the treemap display page 600 is a published output of the an entire sourced data table, wherein the fragment of the entire sourced data table is represented by FIG. 3. The hierarchy depth level is determined. In this example, the Organization data dimension is the highest level of hierarchy, followed by the Customer data dimension for the lower hierarchy level, and the Item data dimension for the lowest hierarchy level. After an aggregate function is selected for the area graphical attribute, the aggregate values for each group are determined. In this example, a mean aggregate function is selected for area across all levels of hierarchy. In one embodiment, the mean aggregate value for cell 610 in the Fort Worth>Target>Item=MRX013 group is determined by taking the mean of all the data values within the group. Using the data values from table fragment 300, the mean is 73,146.5, which is determined from the values 68,150 and 78,143. The area occupied by cell 610 is proportional to the value it represents in comparison to the other cells in the group.

Figure 7:
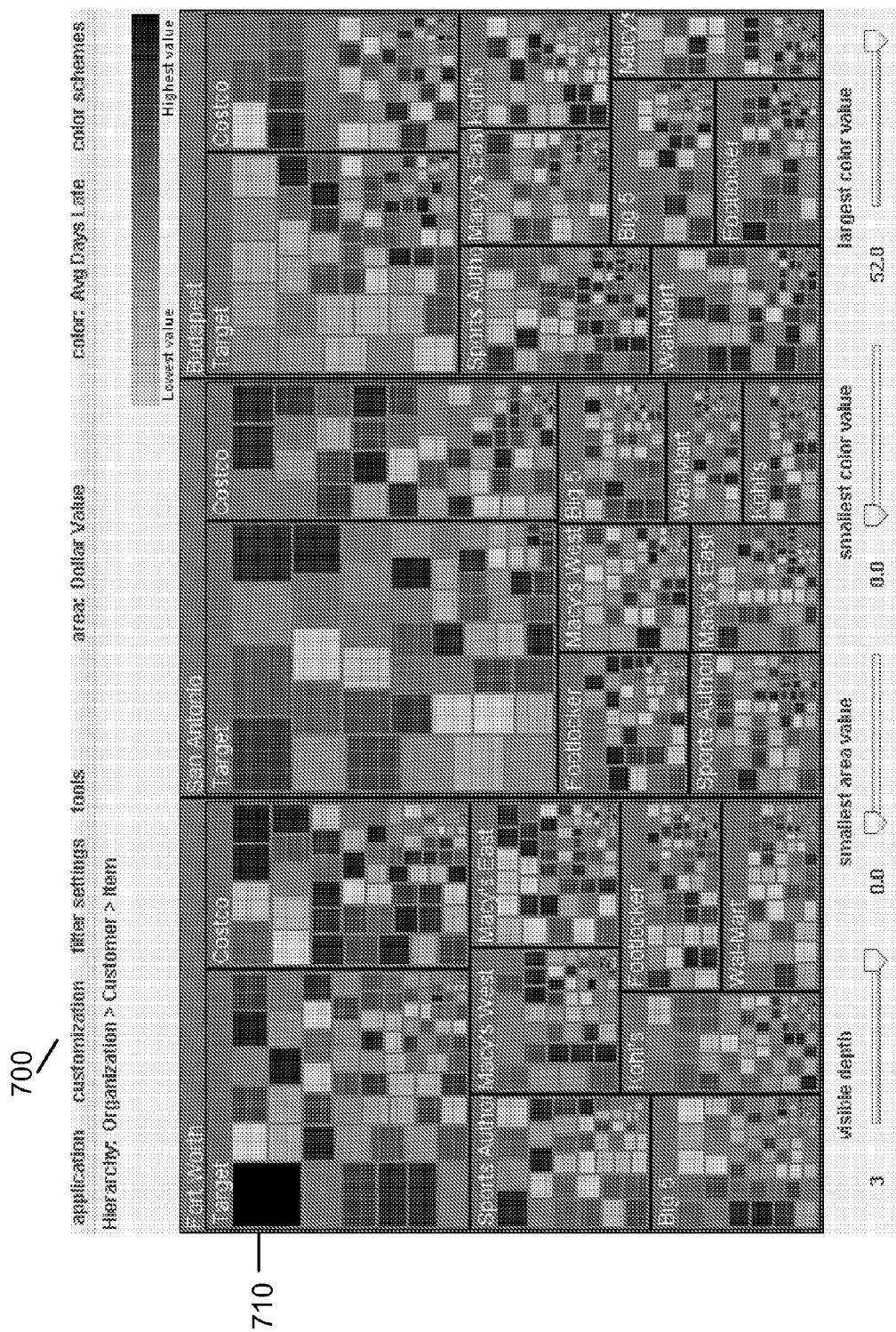
FIG. 7 shows a screenshot of an exemplary treemap component using median aggregation.

FIG. 7 shows a screenshot of an exemplary treemap component using median aggregation. In one embodiment, the treemap display page 700 is a published output of the an entire sourced data table, wherein the fragment of the entire sourced data table is represented by FIG. 3. The hierarchy depth level is determined. In this example, the Organization data dimension is the highest level of hierarchy, followed by the Customer data dimension for the lower hierarchy level, and the Item data dimension for the lowest hierarchy level. After an aggregate function is selected for the area graphical attribute, the aggregate values for each group are determined. In this example, a median aggregate function is selected for area across all levels of hierarchy. The aggregate value for cell 710 in the Fort Worth>Target>Item=MRX013 group is determined by taking the median of all the data values within the group.

Figure 8:
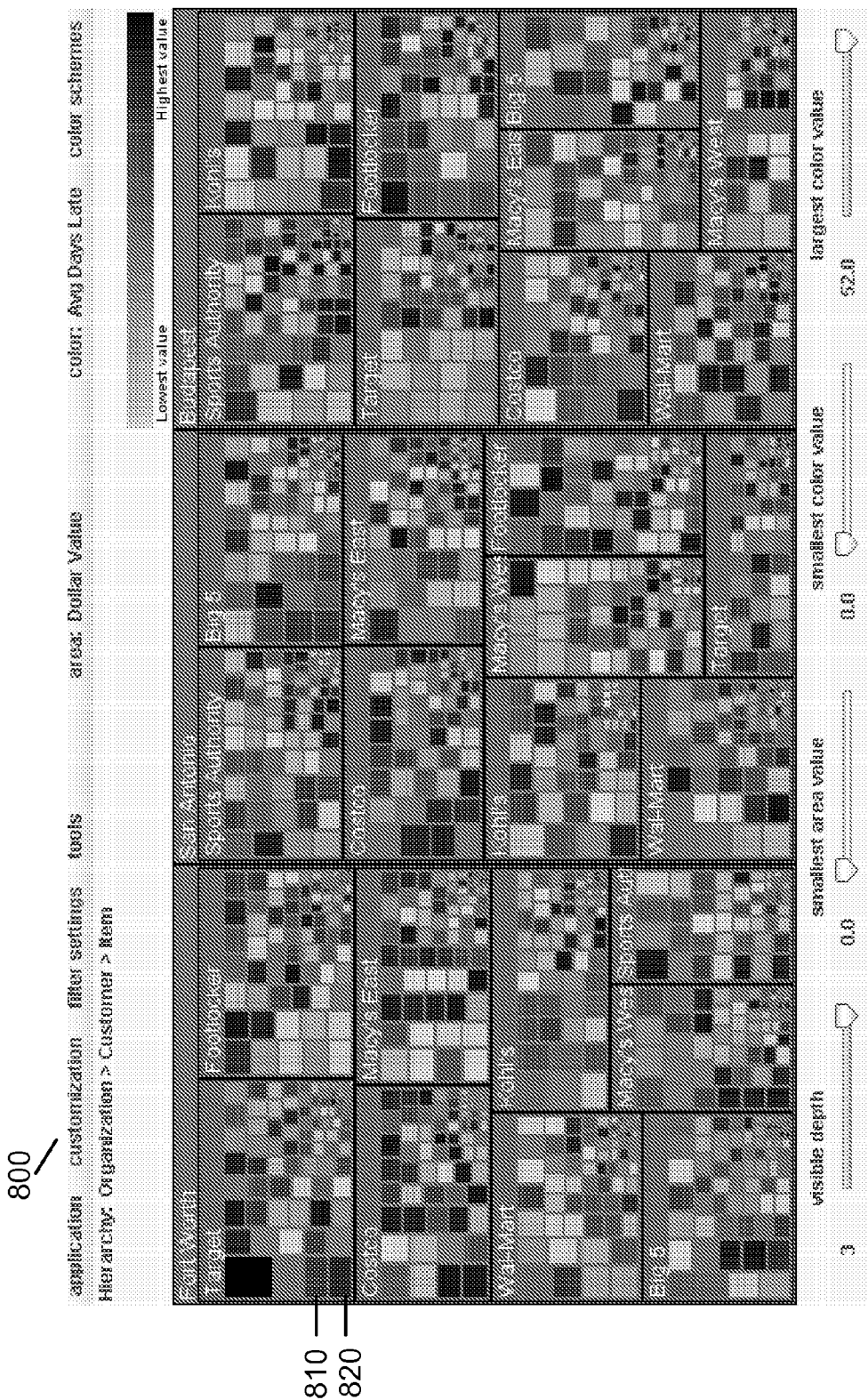
FIG. 8 shows a screenshot of an exemplary treemap component using count aggregation.

FIG. 8 shows a screenshot of an exemplary treemap component using count aggregation. In one embodiment, the treemap display page 800 is a published output of the an entire sourced data table, wherein the fragment of the entire sourced data table is represented by FIG. 3. The hierarchy depth level is determined. In this example, the Organization data dimension is the highest level of hierarchy, followed by the Customer data dimension for the lower hierarchy level, and the Item data dimension for the lowest hierarchy level. After an aggregate function is selected for the area graphical attribute, the aggregate values for each group are determined. In this example, a count aggregate function is selected for area across all levels of hierarchy. For a "count" aggregation function, an aggregate value for a cell representing a group is the number of children nodes within the group. The "count" aggregation function does not take into account the magnitude of the data values of the children nodes. In this example, the aggregate value for the parent cell 810 in the Fort Worth>Target>Item=MRX013 group is determined by counting the number of data values within the group. In other words, the aggregate value is determined by the number of children nodes in the group, not by the values of the children nodes. Using the data values from table fragment 300, the count is 2. The area occupied by cell 810 is proportional to the value it represents in comparison to the other cells in the group. Accordingly, the area occupied by cell 810 is equal to the area occupied by cell 820, which represents the Fort Worth>Target>Item=TRBZ007 group. The value of 820 is also two.

Figure 9:
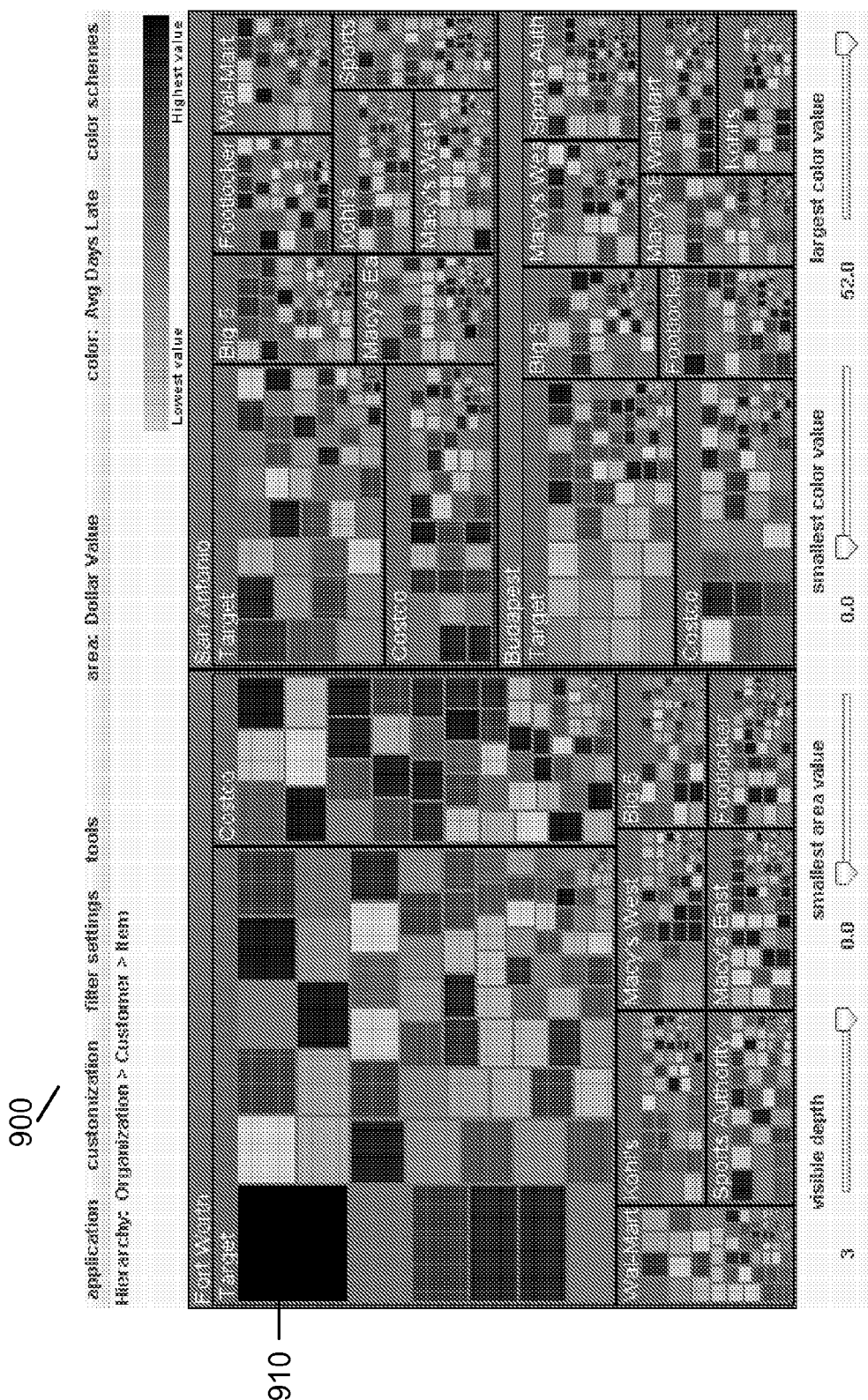
FIG. 9 shows a screenshot of an exemplary treemap component using max aggregation.

FIG. 9 shows a screenshot of an exemplary treemap component using max aggregation. In one embodiment, the treemap display page 900 is a published output of the an entire sourced data table, wherein the fragment of the entire sourced data table is represented by FIG. 3. The hierarchy depth level is determined. In this example, the Organization data dimension is the highest level of hierarchy, followed by the Customer data dimension for the lower hierarchy level, and the Item data dimension for the lowest hierarchy level. After an aggregate function is selected for the area graphical attribute, the aggregate values for each group are determined. In this example, a maximum value aggregate function is selected for area across all levels of hierarchy. The aggregate value for parent cell 910 in the Fort Worth>Target>Item=MRX013 group is determined by the maximum value of the children nodes within the group. Using the data values from table fragment 300, the max aggregate value is 78143. The area occupied by cell 910 is proportional to the value it represents in comparison to the other cells in the group.

The determination of aggregate values and layout of those aggregate values may be implemented for various types of hierarchical data visualizations. For example, a cluster bar graph could be extended to replace one or more cluster of bars with a single aggregate bar. The length of the aggregate bar is determined by any one of a number of selectable aggregation functions. The user or designer may select the aggregate function using, for example, a GUI, API, etc. In another embodiment, instead of aggregating clusters, each series of differently-colored bars could be aggregated to form a single cluster using any one of a number of aggregation functions selectable by the user. Another example may include a hierarchical pie chart where a user may drill-in and view an aggregation of the children nodes of a selected slice. Similar aggregation methods can be applied to various graphical attributes, such as area and color, for the selected slice of the pie chart.

Figure 10A:
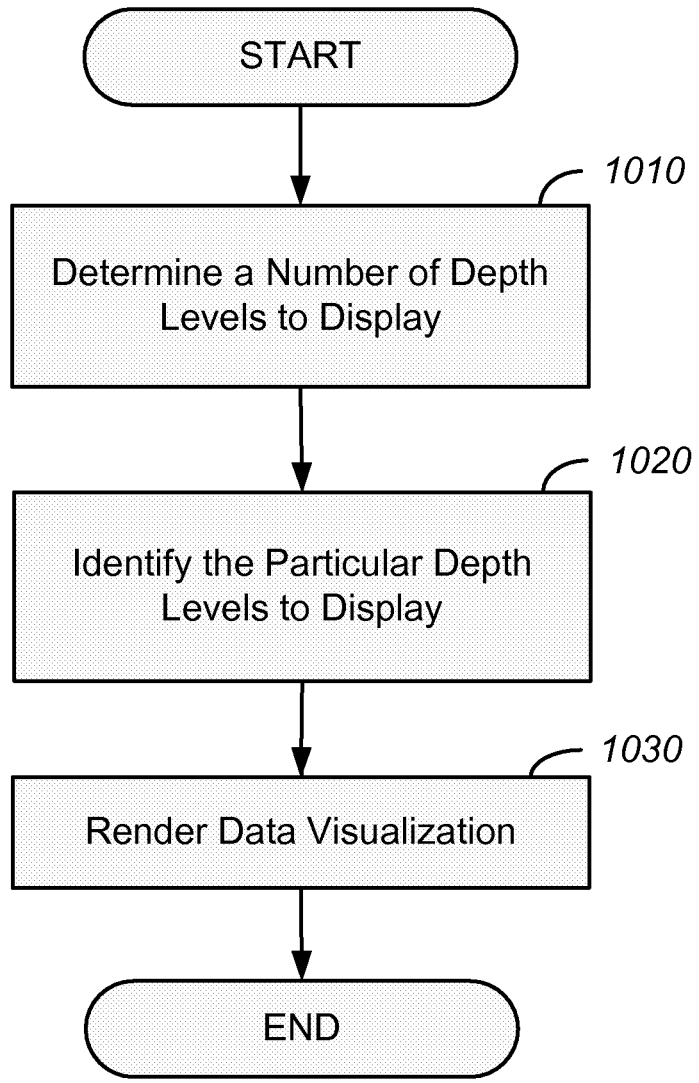
FIG. 10A is an exemplary process flow diagram which illustrates one method of improving data visualization techniques by enabling a user to specify currently visible depth levels to display.

FIG. 10A is an exemplary process flow diagram which illustrates one method of improving data visualization techniques by enabling a user to specify currently visible depth levels to display. At step 1010, a number of depth levels to display is determined. In one embodiment, a number of depth levels to display is selectable by a user or designer where multiple depth levels are possible. For example, hierarchy table 400 indicates that three depth levels are possible for the given dataset. Other methods of determining the total number of possible depth levels may be used. A user or designer may choose to display one, two, or three depth levels. In one embodiment, an interactive control is presented to a user, for example in a user interface region 505 of a treemap display page 500. In one embodiment, the interactive control takes the form of a slider bar 570 to indicate the number of currently visible depth levels. The slider bar may indicate the visible depth levels starting from and including the root of the hierarchical data set. In alternative embodiments, other depth levels may be selected as the starting node.

The interactive control may enforce various constraints or limitations. In cases where multiple levels of hierarchy are possible, the depth level interactive control may limit the number of depth levels that are rendered in the treemap to a maximum threshold number. This limitation ensures that the inner-most nested cells of the treemap are large enough for the cell area and color to be visible and distinguishable. The maximum threshold may be determined automatically using intelligence that associates a max threshold with each type of data visualization. In one embodiment, treemaps are generally less useful when displaying more than about four levels of hierarchy. Accordingly, the maximum threshold may be four levels of hierarchy rendered for a treemap component. Other types of hierarchical data visualizations may be associated with other thresholds. In another embodiment, the maximum threshold may be selected by a designer through an API or GUI.

At step 1020, the particular depth levels to display are identified. Where multiple depth levels are possible and a subset of the possible depth levels are to be displayed, the particular depth levels may be identified by a user. In one embodiment, a "rendered root" may be selected. As used herein, a "rendered root" is a hierarchical data dimension which is displayed as if it were the root of the hierarchical data set. In this example, the rendered root (i.e., Organization) of the treemap component 510 is not the actual root of the hierarchical dataset. Moreover, "rendered leaf nodes" may be selected. As used herein, "rendered leaf nodes" are nodes which correspond to a hierarchical data dimension which is displayed as if it were the leaves of the hierarchical data set. In one embodiment, a user may specify contiguous levels of hierarchy to be displayed in the data visualization. Alternatively, non-contiguous depth levels may also be specified. In one embodiment, an interactive control is presented to a user, for example in a user interface region 505 of a treemap display page 500, for enabling the user to select the particular depth levels. For example, if the determined number of depth levels to be displayed is two, it is determined whether the Organization>Customer depths levels will be displayed or the Customer>Item depth levels will be displayed. Where non-contiguous depth levels may be selected, it will also be determined whether Organization>Item depth levels will be displayed. The interactive control may be in the form of a double-ended slider, checkboxes corresponding to each possible level of hierarchy, or similar user-selectable interfaces used to control the visible depth levels of a hierarchical dataset.

The interactive control may be subject to other constraints. For example, a constraint may be implemented to limit the user's selection such that the innermost nested rectangles correspond to groups that are at some level above the level of the leaf nodes. In another embodiment, the root node may be removed, such that the user may not have the option to select the root node for display.

At step 1030, a current visualization is rendered to include the selected number of visible depth levels and/or the particular depth levels. In one embodiment, aggregate values and layout have already been computed and any change in the visible depth levels does not require re-computation of the aggregate values or layout. It should be noted that although the depth levels and hierarchical values have been described in the context of hierarchy tables and aggregate values, the interface enabling a user to specify currently visible depth levels, as described herein, may be used in conjunction with other hierarchical methods and aggregation techniques.

The interactive control could be implemented for various hierarchical visualization techniques. For example, the interactive control may be implemented on a hierarchy grid or tree table, which displays the hierarchical tree structure in a first column and data attributes in subsequent columns. In another embodiment of a tree structure, the first column includes the root node, parent nodes, and child nodes for each row, and the attributes associated with the nodes in a second column. The tree table may include a slider bar to control either or both of the number of depth levels to view and the particular depth levels to view. Once the selections have been made, the data visualization is rendered with the updated information. The interactive control may also be implemented on a multidimensional viewer (MDV), which is an extension to a data table with graphic bars representing textual data. Each graphic bar represents a data entry in the specified levels of hierarchy. The MDV may also include a slider bar to control either or both of the number of depth levels to view and the particular depth levels to view. Once the selections have been made, the data visualization is rendered with the updated information.

Figure 10B:
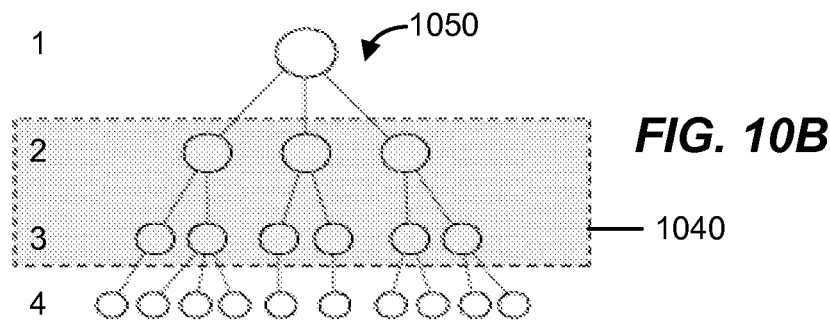
FIGS. 10B-D are diagrams which illustrate one method of improving data visualization techniques by enabling a user to specify currently visible depth levels to display.
Figure 10C:
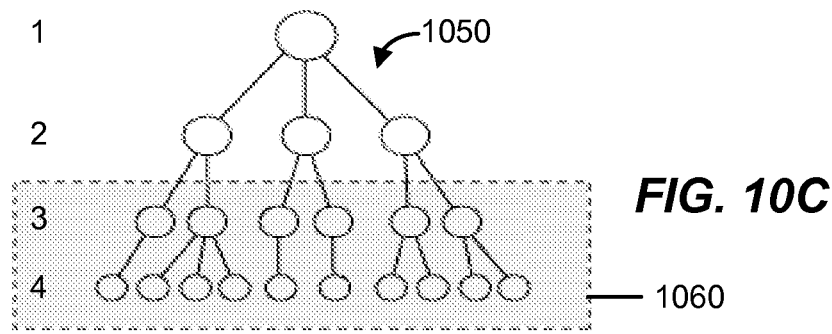
Figure 10D:
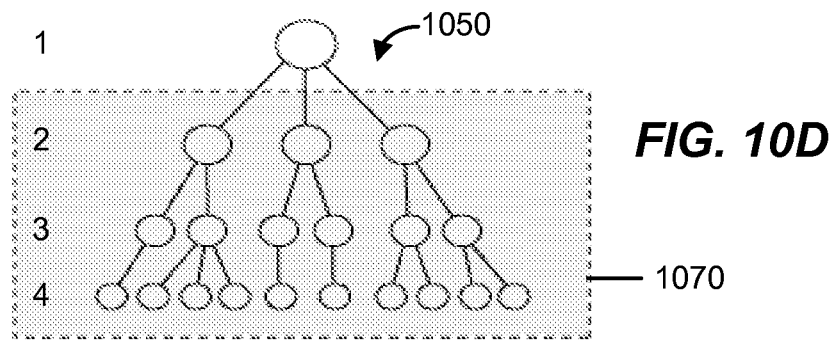

FIGS. 10B-D are diagrams which illustrate one method of improving data visualization techniques by enabling a user to specify currently visible depth levels to display. In another embodiment, the interactive control takes the form of a graphical shape that is positioned on top of a tree diagram. For example the graphical shape may be a rectangle that can be resized and repositioned over the image of a tree diagram. The portion of the tree that overlaps with the rectangle indicates the currently visible hierarchical depth levels. The graphical shape may function similarly to the slider bar. FIG. 10B shows a rectangular control 1040 being positioned over the image of tree diagram 1050 and specifying depth levels 2 and 3. FIG. 10C shows a rectangular control 1060 specifying depth levels 3 and 4. FIG. 10D 1070 shows a rectangular control specifying depth levels 2-4.

Figure 11:
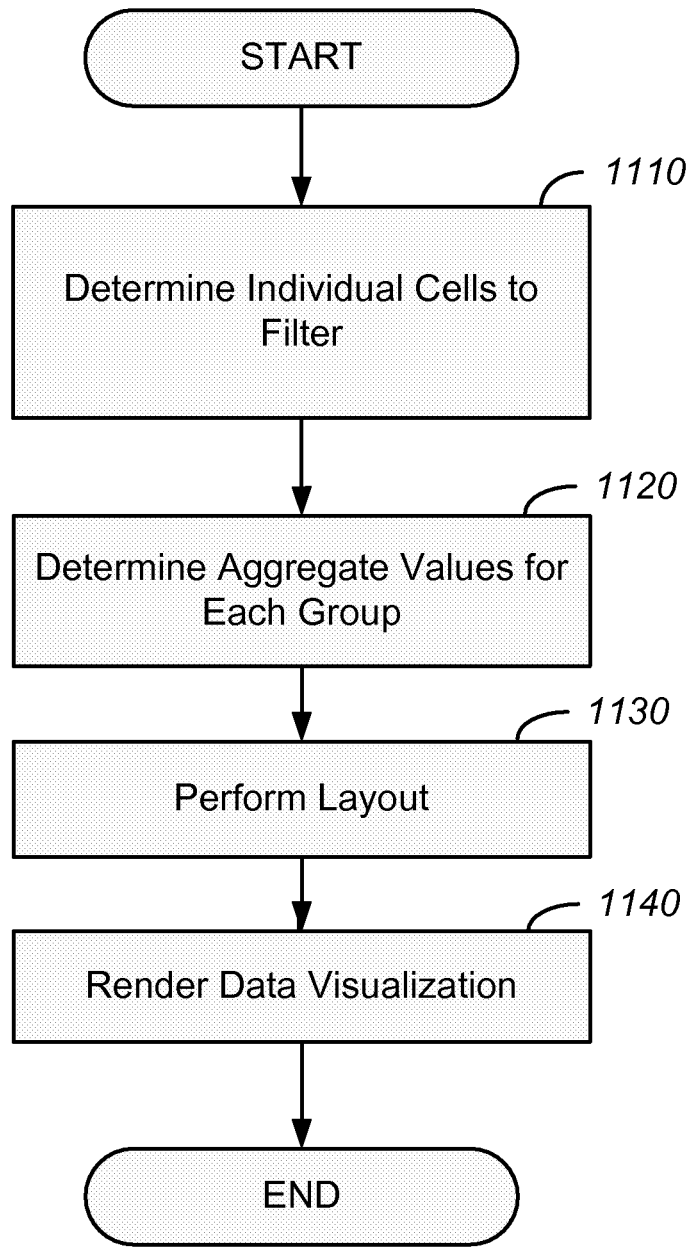
FIG. 11 is an exemplary process flow diagram which illustrates one method of improving data visualization techniques by filtering based on user selection of individual cells.

FIG. 11 is an exemplary process flow diagram which illustrates one method of improving data visualization techniques by filtering based on user selection of individual graphical elements. At step 1110, individual graphical elements, such as cells, to filter are determined. In one embodiment, a user may select a graphical element for filtering. The graphical element may be a group element or a leaf element. A group element may represent a group of data values. A leaf element, for example a leaf node, may represent a single data value at the lowest level of hierarchy. Using a selection tool, such as a cursor, a user may isolate a graphical element on the treemap configuration, such as by placing the cursor in the graphical region of a cell or group and using the cursor to select the cell or group. In this example, the treemap component is also a user interface. The user selection of a graphical element is made through the user interface or the treemap component. Other selection methods may also be implemented.

At step 1120, aggregate values for each group are determined. Where the data set is hierarchical, aggregate values for each group are re-computed to account for the one or more filtered data values. The selected graphical element is effectively a child node and is not considered when determining the updated aggregate values for the parent node. Known methods of performing aggregation may be used. Alternatively, the aggregation method as described herein with reference to FIG. 1 may be used. In one embodiment, the data values to be filtered are flagged. All flagged data values are excluded from the aggregate value. If a last child of the parent node is selected to be filtered, the parent node may be filtered as well.

At step 1130, the layout is re-determined taking the one or more filtered data values into account. The area occupied by a parent node may be reduced due to the filtered data value, depending on the aggregation function. Likewise, the area occupied by other elements and/or groups may also be affected. At step 1140, the data visualization is rendered to reflect the filtered element.

The feature of filtering user-selected elements is further described with regard to FIGS. 12-15. FIG. 12 shows an exemplary data table. In this example, the data table 1200 represents sales orders for Cycles Incorporated ("Cycles Inc."). The table 1200 includes ID, or index, Location, Order_Size, Order_Frequency, Root, and Severity columns.

Figure 13:
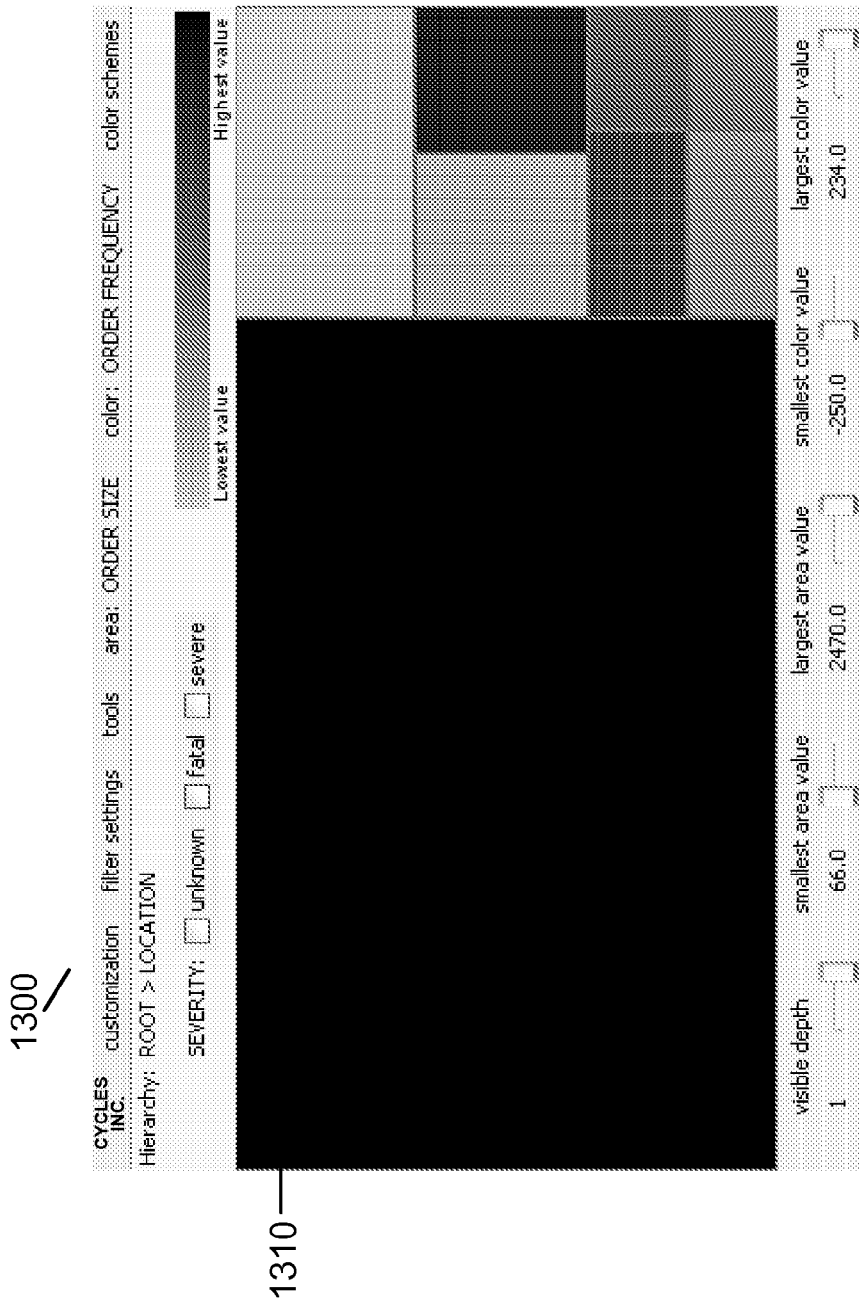
FIG. 13 is a screen shot of an exemplary treemap component and user interface.

FIG. 13 is a screen shot of an exemplary treemap component and user interface. In this example, the treemap display page 1300 is a visualization of the Cycles Inc. data table 1200 of FIG. 12. In this example, the Order Size data dimension is mapped to the area graphical attribute. The cell 1310 occupies the greatest area within the treemap component and thus represents a value of 2470, which is the largest value of the data table 1200.

Figure 14:
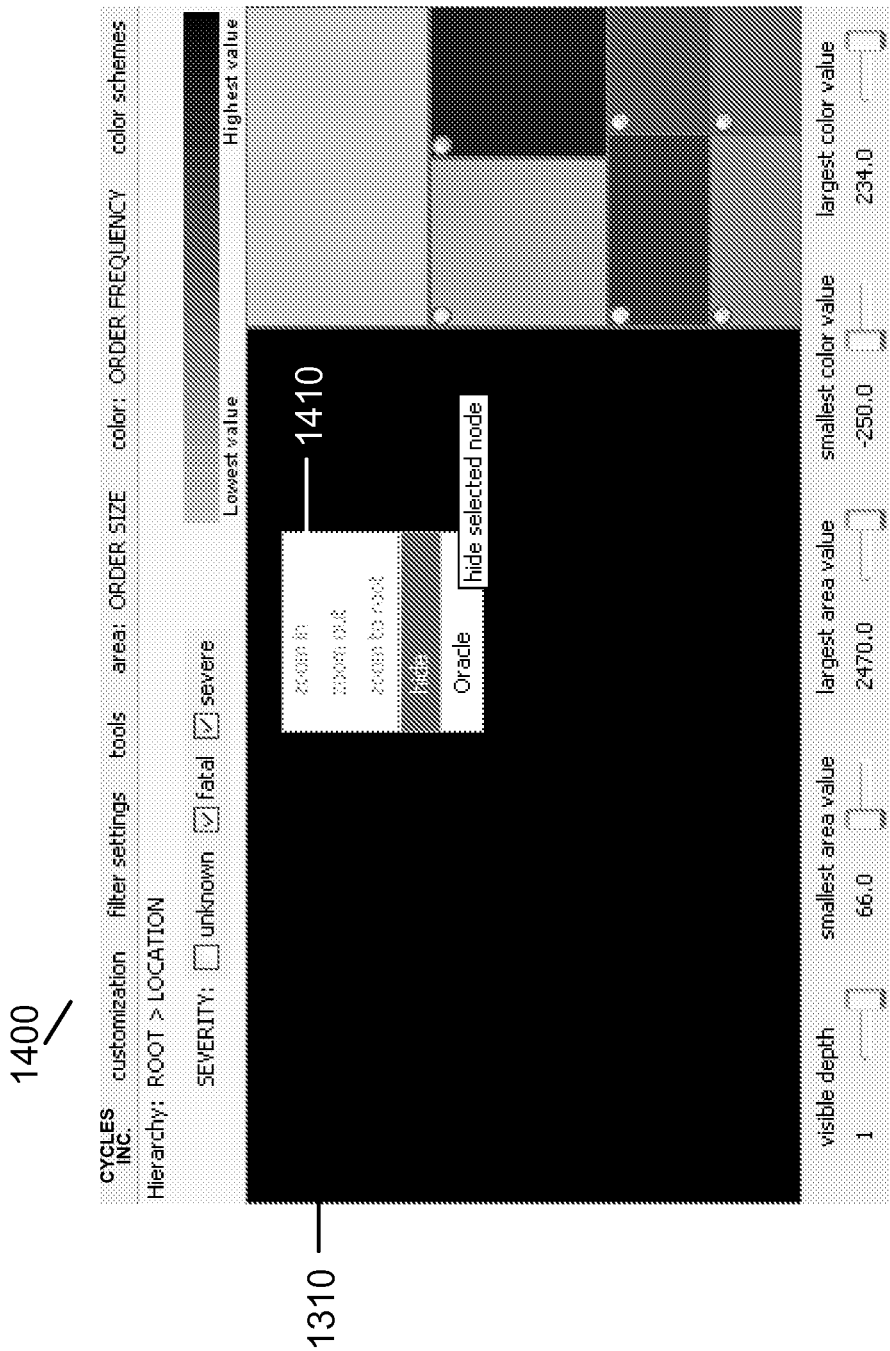
FIG. 14 is a screen shot of an exemplary treemap component and user interface for filtering cells.

FIG. 14 is a screen shot of an exemplary treemap component and user interface for filtering cells. In one embodiment, this feature may be particularly helpful for users to select outliers and other first order effects, which can be filtered out from the data visualization. In this example, the cell 1310 has been selected. A user interface 1410, such as a menu, includes one or more user-selectable functions. The functions may include a "hide" option, which, when selected by the user, filters out the selected cell or group from the data visualization.

Figure 15:
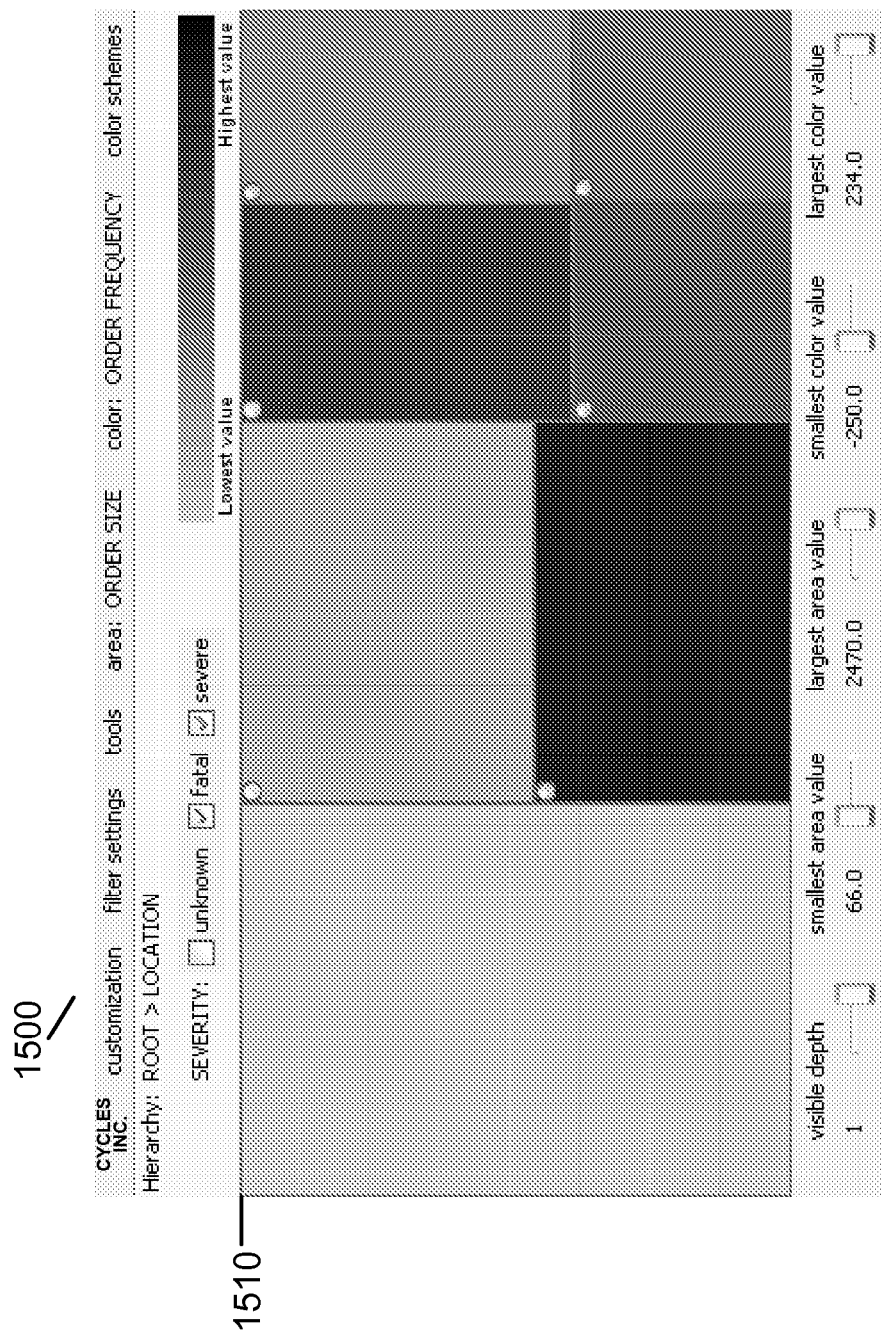
FIG. 15 is a screen shot of an exemplary treemap component and user interface after performing filtering.

FIG. 15 is a screen shot of an exemplary treemap component and user interface after performing filtering. The selected cell 1310 is excluded from the layout of the treemap component 1510 of the treemap display page 1500. The updated aggregate values are determined for each group of each depth level. This step may be omitted where multiple depth levels are not displayed. Layout is performed by mapping the data values that are not to be excluded to a fixed layout area. In this example, the magnitude of an area graphical attribute corresponds to a proportion ratio. A proportion ratio is determined for each non-excluded data value. The proportion ratio represents the ratio of a magnitude of the data value to a magnitude of all non-excluded data values within the range. Each data value of table 1200 except the data entry with ID 2 is represented as a cell in treemap component 1510. Thus, in one embodiment, the area of each rectangle within a single group of the treemap component 1510 is proportional to the magnitude of the corresponding non-excluded data values in that group.

Although the preceding embodiments have been described using a treemap visualization, the method of filtering as taught herein may be implemented for other visualization techniques. In one embodiment, visualization techniques which map data values to ratios of areas, such as pie graphs, are greatly affected by outliers which can consume an inordinate amount of the visible area, making secondary effects particularly difficult to appreciate. Filtering as taught herein may serve as an effective tool for realizing those secondary effects.

Figure 16:
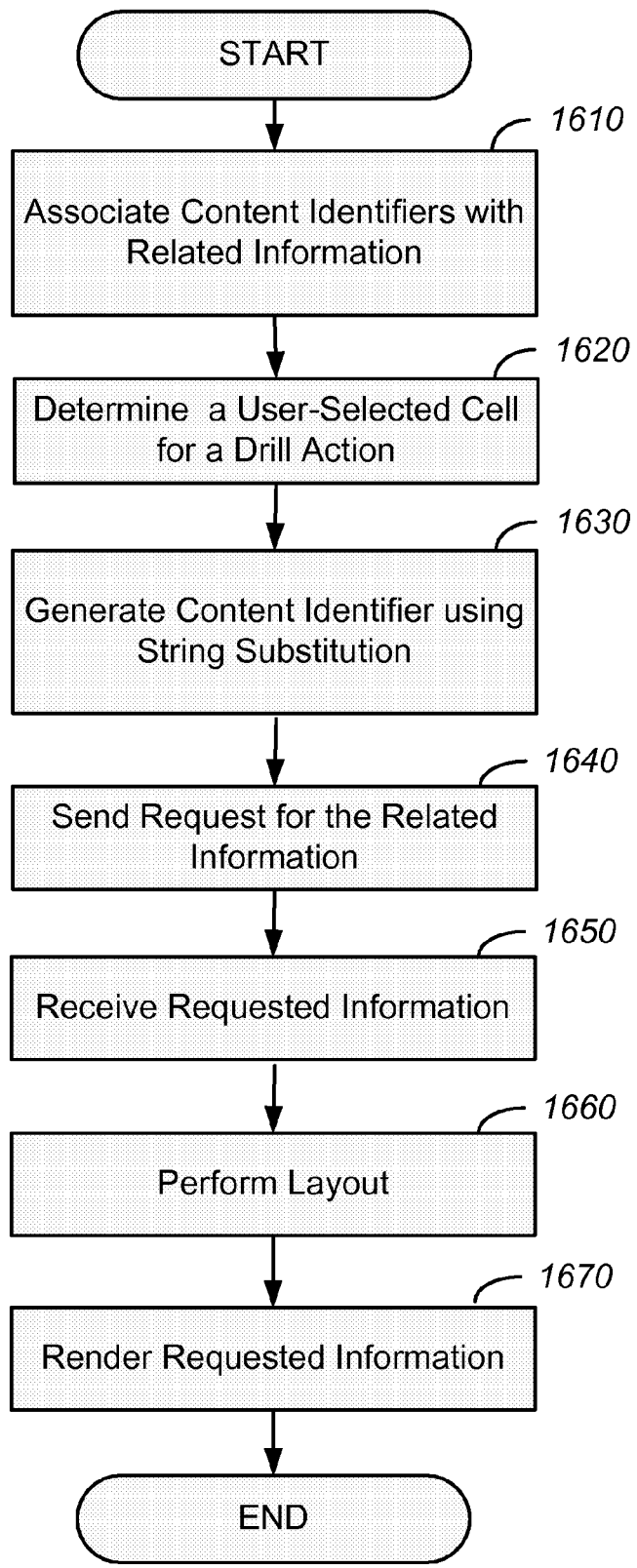
FIG. 16 is an exemplary process flow diagram which illustrates one method of improving data visualization techniques by linking graphical elements of the visualization.

FIG. 16 is an exemplary process flow diagram which illustrates one method of improving data visualization techniques by linking graphical elements of the visualization. In one embodiment, graphical elements of the data visualization are linked to related information. Examples of related information include information from other software systems or methods, other data visualizations, or other processes not performed by the current data visualization system. Graphical elements, such as graphical cells in the data visualization serve as an entrance point into separate data spaces in a drill-to-related information approach where the selection of a cell then displays the related data space or a report in graphic, text, or other format. At step 1610, content identifiers associate data with information related to the data. In one embodiment, the content identifier associates a data table of the dataset with related information. Universal resource locators (URLs) may be used as content identifiers. Accordingly, a data table-URL pairing is created. During initialization of a treemap display page or for modification of the treemap display, a user or designer pairs a data table name with a URL. The URL includes a generic substring that will be replaced. In one embodiment, other data tables may be selected for example through an application menu for changing the sourced dataset for a data visualization. In one embodiment, the content identifiers are automatically generated.

At step 1620, a user-selected cell is determined for a drill action. In one embodiment, an initial treemap configuration is generated. The treemap configuration may serve as a user interface which receives the user selections of cells. A user may designate, using a cursor, a treemap cell upon which a drill action is to be performed. The user may select the designated cell by a mouse-click. The selected cell, which represents one or more data entries of the data table, is then determined. Upon selection of the cell, a graphical user interface, such as a menu, may be presented including an option to display related information, such as an option to drill. A user may specify the option to drill by selecting the option in the menu. Other known methods of determining a user-selected graphical element for a drill action may also be used.

At step 1630, a content identifier is generated using string substitution. The selected cell is associated with one or more data entries each of which are associated with a unique identifier. In one embodiment, each row of the data table is a leaf node of the data visualization. The first column of the data table is expected to be an index. In another embodiment, a unique identifier may be determined for each data entry by other methods. Once the drill action is specified by a user, the index value is used as a unique identifier for each data entry or row. The URL paired to the data table name in step 1610 includes the generic substring, which is then replaced by the identifier of the selected treemap cell node. For example, URL http://bug.cyclesinc.com?queryId= |TM_ID|&secondaryId=|TM_LABEL| may be associated with a particular data table of the dataset. Other URLs may be associated with other data tables of the dataset. The URL includes a generic substring '|TM_ID|' that will be replaced by the unique identifier of the selected treemap cell node. Referring to data table fragment 300 of FIG. 3, the first column is an index column. The data value 10011 under the index ID column for a data entry corresponding to a selected cell with order number ORD-272536, for example, replaces the generic substring |TM_ID| in the URL. In other words, the generic substring occurrences in the URL string are replaced with another string, that is, the index identifier of the user-selected cell. In an alternative embodiment, a URL including a '|TM_LABEL|' in addition to the identifier substring will be replaced by a label of the data entry corresponding to the selected cell. The labels are determined by the current values of the hierarchical categories.

For example, a user may select leaf element or leaf cell 550 of FIG. 5. A leaf cell is at the lowest displayed level of hierarchy, which in treemap 500 is of type 'Item.' The particular leaf cell 550 may map to the last row in table 300. In one embodiment, the generic substring '|TM_ID|' may be replaced by the value in the ID column, '10023', and the generic substring '|TM_LABEL|' may be replaced by the value in the column that holds the values associated with Items, or 'MRX013'. In another embodiment, if a user selected a non-leaf node cell, such as the Target cell within the Fort Worth cell, the generic substring '|TM_LABEL|' might be replaced by a string to indicate the selected group, such as 'Fort Worth|Target'.

In another embodiment, a group element or group cell representing an aggregate value of a plurality of leaf nodes may be selected. In this case, a data table of aggregate values is created during aggregation. Aggregate values may be determined as described with regard to FIG. 2 or using prior art aggregation methods. Each row of the aggregate data table represents an aggregate value of a plurality of leaf nodes. Aggregate data tables may be determined for each level of hierarchy. Each aggregate value in the aggregate data table corresponds with a unique identifier. In one embodiment, the aggregate data table includes an index column which may be used as the unique identifier. The index identifier corresponding to the selected aggregate cell replaces the substring |TM_ID| in the URL. Likewise, the substring '|TM_LABEL|' may also be replaced with the current values determined from the hierarchical table.

At step 1640, a request for the related information is sent. In one embodiment, a standard web browser is used to request the web content related with the generated content identifier URL. At step 1650, the requested information is received. For example, the web browser may receive the requested content. At step 1660, layout is performed. This step may be bypassed if layout is not required. At step 1670, the requested information is rendered. Thus, the functions of drilling to details of a cell or drilling through, for example, to a report, are enabled. Moreover, the drilling functions are enabled within a web environment across various applications in addition to the application schema associated with the data table and across various web servers.

Moreover, the methods as taught herein may be extended to various other data visualizations with user-selectable graphical elements, such as, a pie graph or a bar graph. Code within the visualization component may replace the substrings in the content identifier with an ID and possibly a Label of a selected slice of a pie or a bar of a bar graph. A standard web browser may then be used to request the web content associated with the generated URL. In one embodiment, the content identifiers are specified as applet parameters. Applet parameters may be implemented for thick clients. In another embodiment, content identifiers may also be specified as JavaScript string literals using JavaScript Object Notation (JSON) or HTML attribute tags, which are stored in a web page's document object model (DOM). These are retrieved and processed by JavaScript code. String literals or attribute tags may be implemented for thin clients.

FIG. 17 shows an exemplary table. Bugs table 1700 may be a data table that has been selected as the source data for the data visualization. Bugs table 1700 includes the column names and data types of the column names for a Bugs data table (not shown), where each row of the Bugs data table represents a programming bug, error, fault, mistake or failure. In this example, the Bugs table 1700 and Bugs data table are included in an Asset Management application.

Figure 18:
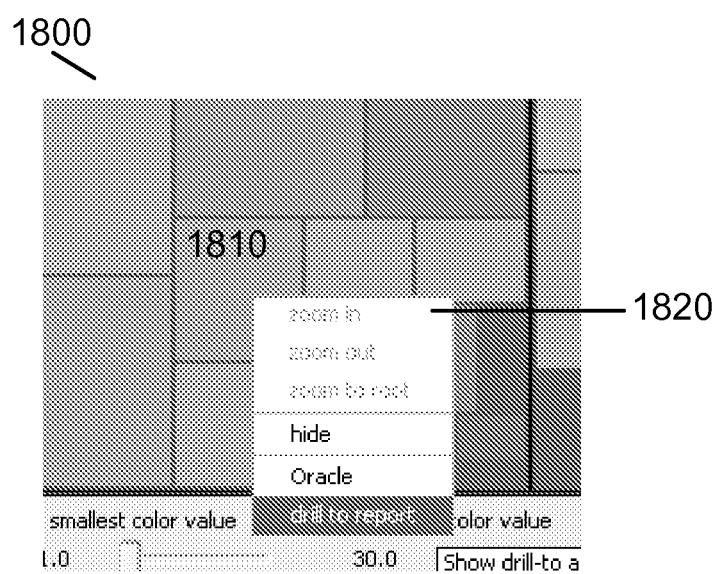
FIG. 18 is a screen shot of an exemplary treemap component and user interface for selecting a drilling option.

FIG. 18 is a screen shot of an exemplary treemap component and user interface for selecting a drilling option. In one embodiment, a treemap component corresponding to the Bugs data table is generated. Treemap component 1800 may represent a fragment of the generated treemap. In this example, cell 1810 is selected for a drilling action. A pre-report 1820 may be generated to provide a menu of user-selectable options, including an option to "drill to report." In one embodiment, the drill to report option, when selected, may initiate a function which is performed beyond the data visualization component itself. In one embodiment, the initiated functions are performed by other web-accessible processes, programs, or web services.

Figure 19:
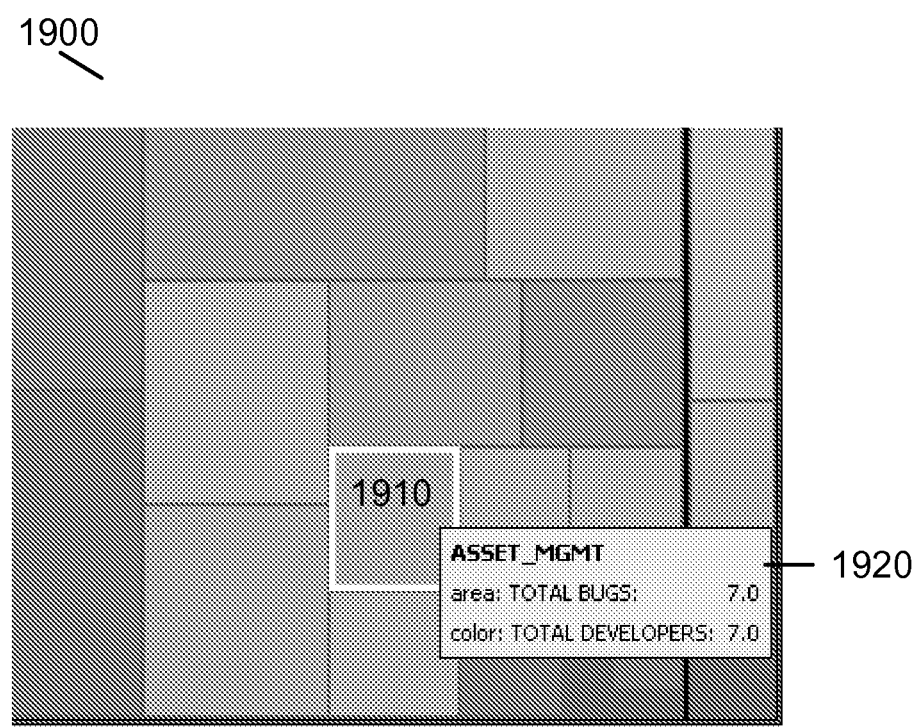
FIG. 19 is a screen shot of an exemplary treemap component and user interface for providing a pre-report for a selected cell.

FIG. 19 is a screen shot of an exemplary treemap component and user interface for providing a pre-report for a selected cell. In one embodiment, a treemap component corresponding to the Bugs data table is generated. Treemap component 1900 may represent a fragment of the generated treemap. In this example, cell 1910 is selected for a drilling action. A pre-report 1920 may be generated to provide details of the selected cell 1910. The detail information may be source from the Bugs data table. Pre-report 1920 includes the name of the application, "ASSET_MGMT," the number of total bug data entries represented by the selected cell, which is seven, and the total number of developers associated with the bug data entries, which is also seven.

In one embodiment, a drill through function, such as the "drill to report" function of FIG. 18, links a selected cell to related information, such as a report. In one embodiment, the treemap components 1800 and 1900 are generated from a snapshot of the Bugs data table, whereas reports or other functions performed beyond the visualization component are generated from a current state of the sourced data table or database if a data object spans multiple tables.

Figure 20:
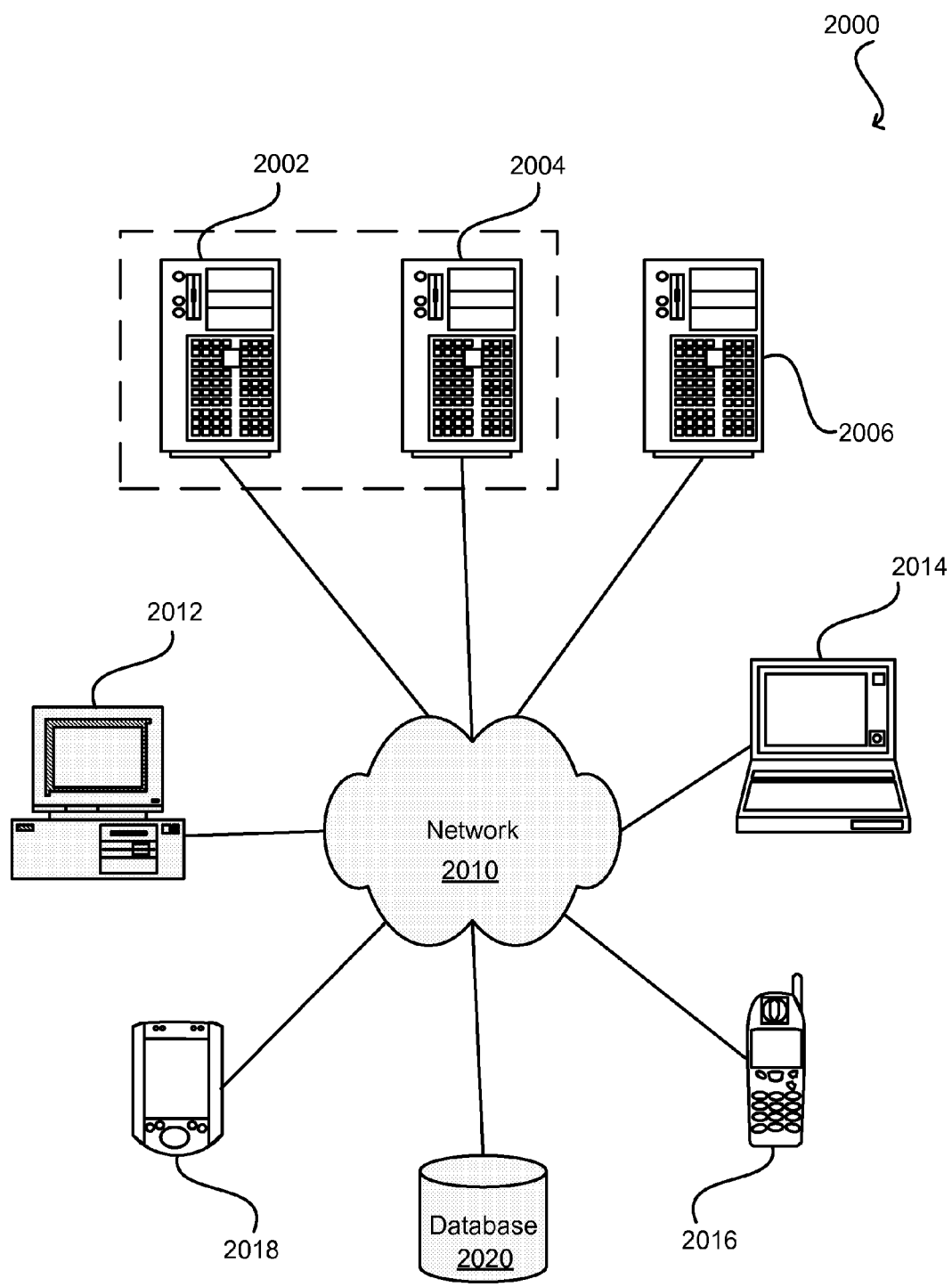
FIG. 20 is a block diagram illustrating components of an exemplary operating environment in which various embodiments of the present invention may be implemented.

FIG. 20 is a block diagram illustrating components of an exemplary operating environment in which various embodiments of the present invention may be implemented. The system 2000 can include one or more user computers, computing devices, or processing devices 2012, 2014, 2016, 2018, which can be used to operate a client, such as a dedicated application, web browser, etc. The user computers 2012, 2014, 2016, 2018 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 2012, 2014, 2016, 2018 may also have any of a variety of applications, including one or more development systems, database client and/or server applications, and Web browser applications. Alternatively, the user computers 2012, 2014, 2016, 2018 may be any other electronic device, such as a thin-client computer, Internet-enabled gaming system, and/or personal messaging device, capable of communicating via a network (e.g., the network 2010 described below) and/or displaying and navigating Web pages or other types of electronic documents. Although the exemplary system 2000 is shown with four user computers, any number of user computers may be supported.

In most embodiments, the system 2000 includes some type of network 2010. The network may can be any type of network familiar to those skilled in the art that can support data communications using any of a variety of commercially-available protocols, including without limitation TCP/IP, SNA, IPX, AppleTalk, and the like. Merely by way of example, the network 2010 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 2002, 2004, 2006 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 2006) may be dedicated to running applications, such as a business application, a Web server, application server, etc. Such servers may be used to process requests from user computers 2012, 2014, 2016, 2018. The applications can also include any number of applications for controlling access to resources of the servers 2002, 2004, 2006.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 2012, 2014, 2016, 2018. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 2012, 2014, 2016, 2018.

The system 2000 may also include one or more databases 2020. The database(s) 2020 may reside in a variety of locations. By way of example, a database 2020 may reside on a storage medium local to (and/or resident in) one or more of the computers 2002, 2004, 2006, 2012, 2014, 2016, 2018. Alternatively, it may be remote from any or all of the computers 2002, 2004, 2006, 2012, 2014, 2016, 2018, and/or in communication (e.g., via the network 2010) with one or more of these. In a particular set of embodiments, the database 2020 may reside in a storage-area network ("SAN") familiar to those skilled in the art. Similarly, any necessary files for performing the functions attributed to the computers 2002, 2004, 2006, 2012, 2014, 2016, 2018 may be stored locally on the respective computer and/or remotely, as appropriate. In one set of embodiments, the database 2020 may be a relational database, such as Oracle 10g, that is adapted to store, update, and retrieve data in response to SQL-formatted commands.

Figure 21:
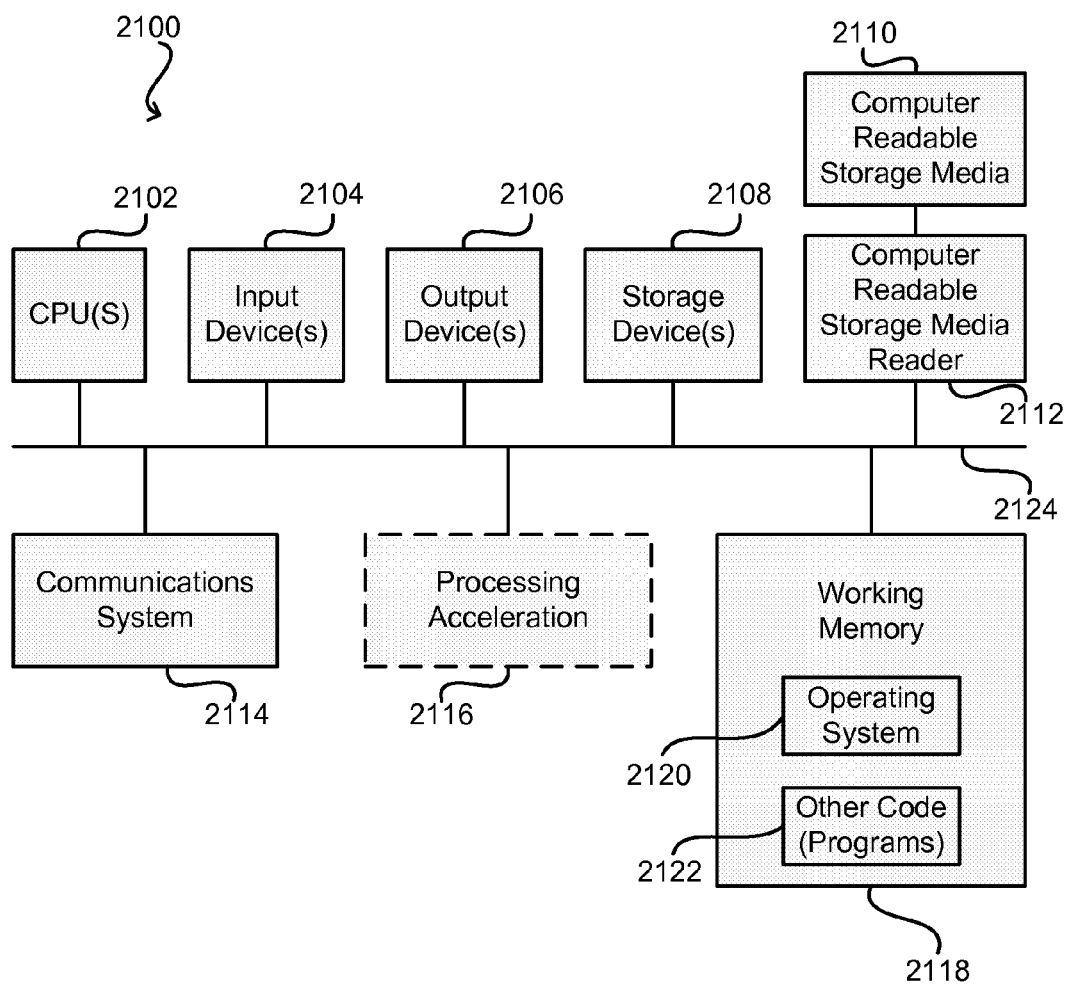
FIG. 21 illustrates an exemplary computer system in which various embodiments of the present invention may be implemented.

FIG. 21 illustrates an exemplary computer system 2100, in which various embodiments of the present invention may be implemented. The system 2100 may be used to implement any of the computer systems described above. The computer system 2100 is shown comprising hardware elements that may be electrically coupled via a bus 2124. The hardware elements may include one or more central processing units (CPUs) 2102, one or more input devices 2104 (e.g., a mouse, a keyboard, etc.), and one or more output devices 2106 (e.g., a display device, a printer, etc.). The computer system 2100 may also include one or more storage devices 2108. By way of example, the storage device(s) 2108 can include devices such as disk drives, optical storage devices, solid-state storage device such as a random access memory ("RAM") and/or a read-only memory ("ROM"), which can be programmable, flash-updateable and/or the like.

The computer system 2100 may additionally include a computer-readable storage media reader 2112, a communications system 2114 (e.g., a modem, a network card (wireless or wired), an infra-red communication device, etc.), and working memory 2118, which may include RAM and ROM devices as described above. In some embodiments, the computer system 2100 may also include a processing acceleration unit 2116, which can include a digital signal processor DSP, a special-purpose processor, and/or the like.

The computer-readable storage media reader 2112 can further be connected to a computer-readable storage medium 2110, together (and, optionally, in combination with storage device(s) 2108) comprehensively representing remote, local, fixed, and/or removable storage devices plus storage media for temporarily and/or more permanently containing computer-readable information. The communications system 2114 may permit data to be exchanged with the network and/or any other computer described above with respect to the system 2100.

The computer system 2100 may also comprise software elements, shown as being currently located within a working memory 2118, including an operating system 2120 and/or other code 2122, such as an application program (which may be a client application, Web browser, mid-tier application, RDBMS, etc.). It should be appreciated that alternate embodiments of a computer system 2100 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Although the present invention has been described in detail with regarding the exemplary embodiments and drawings thereof, it should be apparent to those skilled in the art that various adaptations and modifications of the present invention may be accomplished without departing from the spirit and the scope of the invention. Thus, by way of example and not of limitation, the present invention is discussed with regard to treemap components as illustrated by the figures. However, the methods may be implemented for various data visualizations, both hierarchical and non-hierarchical in nature, unless specified otherwise. Accordingly, the invention is not limited to the precise embodiment shown in the drawings and described in detail herein above. The scope of the invention should, therefore, be determined not with reference to the above description, but instead should be determined with reference to the pending claims along with their full scope or equivalents.

What is claimed is:

1. A method for representing a plurality of data values of a hierarchical dataset as graphical elements in a configurable data visualization, comprising:
    displaying, by a computer system, a first data visualization and a user interface in a data visualization display page, the first data visualization is displayed based on a default configuration of hierarchical depth levels of the dataset;
    determining, by the computer system, a number of depth levels to display in a second data visualization based at least in part upon a number of the hierarchical depth levels of the dataset;
    identifying, by the computer system, which of the depth levels of the dataset to display based on user selections received through the user interface, at least one of the identified depth levels having a plurality of data values corresponding to one or more graphical elements,
        wherein a selection from hierarchical depth levels of the default configuration of the dataset corresponds to a rendered root node of a modified configuration of hierarchical depth level of the dataset represented by the second data visualization, and
        wherein one or more selections from a subset of the hierarchical depth levels of the default configuration of the dataset correspond to rendered leaf nodes of the modified configuration of hierarchical depth level of the dataset represented by the second data visualization;
    determining, by the computer system, an arrangement of the identified hierarchical depth levels of the dataset for the modified configuration; and
    rendering, by the computer system, the second data visualization based on the determined number of depth levels, the identified depth levels, and the determined arrangement of the modified configuration,
        wherein a first subset of graphical elements corresponding to a lower hierarchical depth level in the modified configuration of the second data visualization is rendered within a graphical area of the second subset of the graphical elements corresponding to a higher hierarchical depth level in the modified configuration of the second visualization.

2. The method of claim 1, wherein the identified depth levels are contiguous.

3. The method of claim 1, wherein the user interface limits the selection of the number of depth levels to be displayed.

4. The method of claim 1, wherein the user interface limits the selection of the number of depth levels to be displayed to a maximum number of depth levels.

5. The method of claim 1, wherein the user interface limits the selection of the number of depth levels to be displayed to a maximum threshold less than a maximum number of depth levels.

6. The method of claim 5, wherein the maximum number is based on a type of the data visualization.

7. The method of claim 1, wherein the user interface limits selection of the rendered leaf nodes to be displayed in the second data visualization.

8. The method of claim 1, wherein the user interface limits selection of leaf nodes of the hierarchical dataset from being displayed in the second data visualization as the rendered leaf node.

9. The method of claim 1, wherein the user interface limits selection of the rendered root node to be displayed in the second data visualization.

10. The method of claim 1, wherein the user interface limits selection of a root node of the hierarchical dataset from being displayed in the second data visualization as the rendered root node.

11. The method of claim 1, wherein the user interface is a double-ended slider bar, a first end of the slider bar selecting the rendered root node and a second end of the slider bar selecting the rendered leaf nodes.

12. A non-transitory computer-readable medium having stored thereon program code for representing a plurality of data values of a hierarchical dataset as graphical elements in a configurable data visualization, the program code comprising:
    code for displaying a first data visualization and a user interface in a data visualization display page, the first data visualization is displayed based on a default configuration of hierarchical depth levels of the dataset;
    code for determining a number of depth levels to display in a second data visualization based at least in part upon a number of the hierarchical depth levels of the dataset;
    code for identifying which of the depth levels to display based on user selections received through the user interface, at least one of the identified depth levels having a plurality of data values corresponding to one or more graphical elements,
        wherein a selection from hierarchical depth levels of the default configuration of the dataset corresponds to a rendered root node of a modified configuration of hierarchical depth level of the dataset represented by the second data visualization, and
        wherein one or more selections from a subset of the hierarchical depth levels of the default configuration of the dataset correspond to rendered leaf nodes of the modified configuration of hierarchical depth level of the dataset represented by the second data visualization; and
    code for determining an arrangement of the identified hierarchical depth levels of the dataset for the modified configuration;

code for rendering the second data visualization based on the determined number of depth levels, the identified depth levels, and the determined arrangement of the modified configuration, wherein a first subset of graphical elements corresponding to a lower hierarchical depth level in the modified configuration of the second data visualization is rendered within a graphical area of the second subset of the graphical elements corresponding to a higher hierarchical depth level in the modified configuration of the second visualization.

13. The non-transitory computer-readable medium according to claim 12, wherein the user interface limits the selection of the number of depth levels to be displayed.

14. The non-transitory computer-readable medium according to claim 12, wherein the user interface limits selection of the rendered leaf nodes to be displayed in the second data visualization.

15. The non-transitory computer-readable medium according to claim 12, wherein the user interface limits selection of leaf nodes of the hierarchical dataset from being displayed in the second data visualization as the rendered leaf nodes.

16. The non-transitory computer-readable medium according to claim 12, wherein the user interface limits selection of a root node of the hierarchical dataset from being displayed in the second data visualization as the rendered root node.

17. A system for representing a plurality of data values of a hierarchical dataset as graphical elements in a configurable data visualization, the system comprising:

a processor; and a memory coupled to the processor, the memory configured to store a plurality of code modules which when executed by the processor cause the processor to:

display a first data visualization and a user interface in a data visualization display page, the first data visualization is displayed based on a default configuration of hierarchical depth levels of the dataset;

determine a number of depth levels to display in a second data visualization based at least in part upon a number of the hierarchical depth levels of the dataset;

identify which of the depth levels to display based on user selections received through the user interface, at least one of the identified depth levels having a plurality of data values corresponding to one or more graphical elements, wherein a selection from hierarchical depth level of the default configuration of the dataset corresponds to a rendered root node of a modified configuration of hierarchical depth level of the dataset represented by the second data visualization, and wherein one or more selections from a subset of the hierarchical depth levels of the default configuration of the dataset correspond to rendered leaf nodes of the modified configuration of hierarchical depth level of the dataset represented by the second data visualization;

determine an arrangement of the identified hierarchical depth levels of the dataset for the modified configuration; and render the second data visualization based on the determined number of depth levels, the identified depth levels, and the determined arrangement of the modified configuration, wherein a first subset of graphical elements corresponding to a lower hierarchical depth level in the modified configuration of the second data visualization is rendered within a graphical area of the second subset of the graphical elements corresponding to a higher hierarchical depth level in the modified configuration of the second visualization.

18. The system of claim 17, wherein the user interface limits the selection of the number of depth levels to be displayed.

19. The system of claim 17, wherein the user interface limits selection of the rendered leaf nodes to be displayed in the second data visualization.

20. The system of claim 1, wherein the user interface limits selection of a root node of the hierarchical dataset from being displayed in the second data visualization as the rendered root node.

21. The method of claim 1, wherein the identified depth levels are non-contiguous.

22. The method of claim 1, wherein the user interface comprises checkboxes, each checkbox corresponding to a possible depth level.

23. The method of claim 1, wherein each subsequent selection from the subset of the hierarchical depth levels of the dataset corresponds to a subsequent depth level of the modified configuration of hierarchical depth level of the dataset represented by the second data visualization, and wherein each data visualization is a hierarchical map having a plurality of graphical elements arranged proportionally based at least in part upon a graphical attribute.

\* \* \* \* \*

UNITED STATES PATENT AND TRADEMARK OFFICE
CERTIFICATE OF CORRECTION

PATENT NO. : 8,640,056 B2  Page 1 of 1
APPLICATION NO. : 11/773895
DATED : January 28, 2014
INVENTOR(S) : Helfman et al.

It is certified that error appears in the above-identified patent and that said Letters Patent is hereby corrected as shown below:

In the Specification

In column 7, line 22, delete "the an" and insert -- an --, therefor.

In column 14, line 58, delete "FIG. 10D 1070" and insert -- FIG. 10D, 1070 --, therefor.

In column 19, line 13, delete "may can" and insert -- can --, therefor.

In the Claims

In column 22, line 24, in Claim 8, delete "node." and insert -- nodes. --, therefor.

Signed and Sealed this
Seventh Day of July, 2015

Michelle K. Lee
*Director of the United States Patent and Trademark Office*